United States Patent [19]

Harris

[11] Patent Number: 5,110,894
[45] Date of Patent: May 5, 1992

[54] COPOLYMERS CONTAINING POLYBENZAZOLE MER UNITS AND POLY(AROMATIC KETONE) OR POLY(AROMATIC SULFONE) MER UNITS

[75] Inventor: William J. Harris, Midland, Mich.

[73] Assignee: The Dow Chemical Company, Midland, Mich.

[21] Appl. No.: 378,360

[22] Filed: Jul. 7, 1989

Related U.S. Application Data

[63] Continuation-in-part of Ser. No. 327,925, Mar. 23, 1989, Pat. No. 5,030,706, which is a continuation-in-part of Ser. No. 256,338, Oct. 12, 1988.

[51] Int. Cl.$^5$ ............... C08G 75/32; C08G 73/22; C08G 73/18
[52] U.S. Cl. ............... 528/128; 528/172; 528/183; 248/179
[58] Field of Search ............... 528/183, 128, 172

[56] References Cited

U.S. PATENT DOCUMENTS

| | | | |
|---|---|---|---|
| 4,533,692 | 8/1985 | Wolfe et al. | 524/417 |
| 4,533,693 | 8/1985 | Wolfe | 524/417 |
| 4,533,724 | 8/1985 | Wolfe et al. | 524/417 |
| 4,539,567 | 11/1982 | Evers | 528/179 |
| 4,578,432 | 3/1986 | Tsai et al. | 528/185 |
| 4,703,103 | 10/1987 | Wolfe et al. | 528/179 |
| 4,772,678 | 9/1988 | Sybert et al. | 528/179 |

FOREIGN PATENT DOCUMENTS

WO86/02368 4/1986 PCT Int'l Appl. .
WO89/07617 8/1989 PCT Int'l Appl. .

OTHER PUBLICATIONS

Ueda et al., "Synthesis of Polyketones by Direct Polycondensation of Dicarboxylic Acid with Diaryl Compounds Using Phosphorous Pentoxide/Methane Sulfonic Acid as Condensing Agent and Solvent", 5 Makromol. Chem., Rapid Comm. 833 (1985).

Ueda, "Synthesis of Poly(Phenylene Ethers Sulfone) by Direct Self-Polycondensation of Sodium 4-Phenoxy Benzene Sulfonate Using Phosphorous Pentoxide/Methane Sulfonic Acid as Condensing Agent and Solvent", 6 Makromol. Chem., Rapid. Comm. 271 (1985).

Colquhoun, "Synthesis of Polyether Ketones in Trifluoromethane Sulfonic Acid", 25(2) Polymer Preprints 17-18 & Table II (1984).

Colquhoun et al., "Synthesis of Aromatic Polyether Ketones in Trifluoromethane Sulfonic Acid", 29 Polymer 1902 (1988).

Imai et al., "Polybenzoxazoles and Polybenzothiazoles", 83 Makromol. Chem. 167 (1965).

11 Ency. Poly. Sci. & Eng., *Polybenzothiazoles and Polybenzoxazoles*, 601 (J. Wiley & Sons 1988).

Hedrick et al., "Synthesis of Imide-Aryl Ether Benzoxazole Random Copolymer", 30 Polymer Preprints 265-66 (1989).

*Primary Examiner*—Veronica P. Hoke

[57] ABSTRACT

Difunctional monomers containing functional moieties suitable for forming azole rings and for forming aromatic ketone or sulfone moieties can be reacted in strong, non-oxidizing, dehydrating acids to form copolymers containing benzazole moieties and aromatic ketone or sulfone moieties. Those copolymers can be extruded to form fibers and films which are thermoplastic.

55 Claims, No Drawings

COPOLYMERS CONTAINING POLYBENZAZOLE MER UNITS AND POLY(AROMATIC KETONE) OR POLY(AROMATIC SULFONE) MER UNITS

STATEMENT OF GOVERNMENT INTEREST

This invention was made with government support under Contract F33615-86-C-5068 awarded by the Department of the Air Force. The government has certain rights in this invention.

CROSS-REFERENCE TO COPENDING APPLICATIONS

This application is a continuation-in-part of copending application Ser. No. 327,925, filed Mar. 23, 1989, now U.S. Pat. No. 5,030,706, which is a continuation-in-part of copending application Ser. No. 256,338, filed Oct. 12, 1988.

BACKGROUND OF THE INVENTION

This invention relates to the art of copolymers containing benzazole mer units and aromatic ketone or aromatic sulfone mer units.

It has been reported that copolymers of poly(aryl ether ketone) and polybenzoxazole or polybenzothiazole can be synthesized in a two-step process by:
(1) contacting 2,5-diaminohydroquinone or 1,4-dithio-2,5-diaminobenzene with phenoxybenzoic acid in polyphosphoric acid under conditions sufficient to form a bis(phenoxyphenyl)-benzo-bisazole: and
(2) contacting that intermediate with terephthaloyl chloride and aluminum trichloride in dimethylformamide.

See Dahl et al., *Aromatic Poly(Ether Ketones) Having Imide, Amide, Ester, Azo, Quinoxaline, Benzimidazole, Benzoxazole or Benzothiazole Groups and Method of Preparation*, PCT Publication 86/02368 (Apr. 24, 1986), which is incorporated herein by reference.

That process ordinarily can not be carried out as a one-pot reaction because the polyphosphoric acid which acts as solvent and catalyst for the first reaction is incompatible with the aluminum chloride which catalyzes the second reaction. The resulting product may contain trapped aluminum chloride which must be removed. What are needed are alternative monomers and processes for synthesizing copolymers of polybenzoxazole and poly(ether ketone) or poly(ether sulfone).

SUMMARY OF THE INVENTION

The first aspect of the present invention is a process for synthesizing a copolymer having benzazole moieties and aromatic ketone or sulfone moieties, said process comprising contacting at least two difunctional monomers in a non-oxidizing, dehydrating solvent acid solution under conditions such that said functional moieties react simultaneously or sequentially to form azole rings and to form aromatic ketone and/or sulfone moieties linking the monomers, whereby the copolymer is formed. Each difunctional monomer contains two functional moieties selected from the group consisting of azole-forming moieties and acylation reactive groups. The functional moieties are chosen such that at least two monomers contain azole-forming moieties capable of reacting to form an azole ring, at least two monomers contain acylation reactive groups capable of reacting to form an aromatic ketone or sulfone moiety, and at least one monomer contains a first functional moiety which acts as an acylation reactive group and a second functional moiety which acts as an azole-forming group.

A second aspect of the present invention is a monomer comprising:
(1) a benzazole moiety:
(2) two decoupling groups bonded to the 2-carbon of an azole ring or to an aromatic group in the benzazole moiety, which each contain two aromatic groups or an aliphatic group; and
(3) two acylation reactive groups, one bonded to each decoupling group in a position wherein it is sufficiently active to undergo aromatic electrophilic substitution in a solvent acid solution.

A third aspect of the present invention is a process for synthesizing a copolymer having benzazole moieties and aromatic ketone or sulfone moieties, said process comprising the step of carrying out a condensation polymerization by aromatic electrophilic substitution in a dehydrating solvent acid solution in the absence of an aprotic Lewis acid, wherein at least one monomer comprises:
(1) a benzazole moiety;
(2) two decoupling groups bonded to the 2-carbon of an azole ring or to an aromatic group in the benzazole moiety, which each contain two aromatic groups or an aliphatic group: and
(3) two acylation reactive groups, one bonded to each decoupling group in a position wherein it is sufficiently active to undergo aromatic electrophilic substitution in a solvent acid solution.

A fourth aspect of the present invention is a copolymer having a plurality of units which each independently comprise:
(1) a benzazole moiety;
(2) a decoupling group bonded to the 2-carbon of an azole ring in said benzazole moiety:
(3) an aromatic sulfone moiety bonded to the decoupling group consisting essentially of an aromatic group bonded to a sulfonyl group; and
(4) a bond or a decoupling group linking the aromatic sulfone moiety to the benzazole moiety of an adjacent mer unit.

Monomers and processes of the present invention can be used to form solutions or dopes containing copolymers having benzazole moieties and aromatic ketone or sulfone moieties. The copolymers can be precipitated from the extruded dopes by known methods to form shaped articles, such as fibers and films. Certain of the copolymers are thermoplastic and can be molded at temperatures above their glass transition temperature to form other shaped articles. Fibers can be used as reinforcement in a matrix composite, films can be used to form laminates and composites, and composites and laminates can be used in structural applications.

DETAILED DESCRIPTION OF THE INVENTION

Definitions

The following terms, which are used repeatedly throughout this application, have the meanings and preferred embodiments set out hereinafter unless otherwise specified.

Acid group (AG)—a carboxylic acid, a sulfonic acid or a derivative of such an acid, such as a halide or ester, which can react in solvent acid with an aromatic group to form an aromatic ketone or sulfone moiety. Acid groups are preferably the acid or acid halide and more preferably a carboxylic acid or carboxylic acid chloride.

Acylation reactive group (AC)—either
(1) an acid group as previously defined or
(2) an aromatic group, which is capable of reacting with another acylation reactive group in the presence of a dehydrating solvent acid to form an aromatic ketone or sulfone. The aromatic group must not contain a deactivating moiety, such as a carbonyl or sulfonyl group, unless the deactivating group is sufficiently decoupled from the reactive site of the acylation reactive group for the reaction to occur.

o-Amino-basic moiety—a moiety, which is bonded to an aromatic group, consisting of
(1) a primary amine group bonded to the aromatic group and
(2) a hydroxy, thiol or primary or secondary amine group bonded to the aromatic group ortho to said primary amine group.

It preferably comprises a hydroxy, thiol or primary amine moiety, more preferably comprises a hydroxy or thiol moiety, and most preferably comprises a hydroxy moiety. Secondary amine groups comprise an aromatic or an aliphatic group and preferably an alkyl group. The secondary amine group preferably comprises no more than about 6 carbon atoms, more preferably no more than about 4 carbon atoms and most preferably no more than about 1 carbon atom.

Aromatic group (Ar)—any aromatic ring or ring system. Size is not critical as long as the aromatic group is not so big that it prevents further reactions of the moiety in which it is incorporated. Each aromatic group independently preferably comprises no more than about 18 carbon atoms, more preferably no more than about 12 carbon atoms and most preferably no more than about 6 carbon atoms. Each may be heterocyclic but is preferably carbocyclic and more preferably hydrocarbyl. If the aromatic group is heterocyclic, the heteroatom is preferably nitrogen.

Unless otherwise specified, each aromatic group may comprise a single aromatic ring, a fused ring system or an unfused ring system containing two or more aromatic moieties joined by bonds or by divalent moieties which are inert under polymerization conditions. Suitable divalent moieties comprise, for example, a carbonyl group, a sulfonyl group, an oxygen atom, a sulfur atom, an alkyl group and/or a perfluorinated alkyl group. Each aromatic group is preferably a single six-membered ring. When the aromatic group is an acylation reactive group, the divalent moiety may not contain deactivating groups, such as carbonyl or sulfonyl groups, unless they are sufficiently removed or decoupled from the reactive site for aromatic electrophilic substitution to occur.

Each aromatic group may contain substituents which are stable in solvent acid, do not interfere with further reactions of the moiety which the aromatic group is part of, and do not undergo undesirable side reactions. Examples of preferred substituents include halogens, alkoxy moieties or alkyl groups. More preferred substituents are either an alkyl group having no more than about 6 carbon atoms or a halogen. Most preferably, each aromatic group contains only those substituents specifically called for hereinafter.

Aromatic ketone or sulfone moiety—a moiety comprising a ketone or sulfone moiety bonded directly to an aromatic group, as that term is defined herein.

Azole ring—an oxazole, thiazole or imidazole ring. The carbon atom bonded to both the nitrogen atom and the oxygen, sulfur or second nitrogen atom is the 2-carbon, as depicted in Formula 1

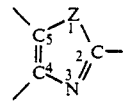

wherein Z is —O—, —S— or —NR—; and R is hydrogen, an aromatic or an aliphatic group, preferably hydrogen or an alkyl group, and most preferably hydrogen. R preferably comprises no more than about 6 carbon atoms, more preferably no more than about 4 and most preferably no more than about 1. Each azole ring is independently preferably oxazole or thiazole and more preferably oxazole. In PBZ polymers, the 4- and 5-carbon of each azole ring is ordinarily fused with an aromatic group.

Azole-forming moiety—an "o-amino-basic moiety" or "electron-deficient carbon group," as those terms are defined herein.

Benzazole moiety—a moiety containing at least one mer unit which comprises:
1) an aromatic group: and
2) a first azole ring fused with said aromatic group.

Aromatic groups and azole rings have the definition and preferred embodiments defined herein. Each mer unit independently preferably further comprises a second azole ring fused with the aromatic group.

Benzazole moieties comprise, on average, less than 10 mer units each, preferably no more than about 5 mer units each, more preferably no more than about 3 mer units each and most preferably no more than about 1 mer unit each. Mer units are preferably linked by a bond from the 2-carbon of an azole ring in one mer unit to either the aromatic group or a divalent moiety (DM) which is organic and is bonded to the 2-carbon of the second azole ring in an adjacent mer unit. Divalent moieties should be inert with respect to all reagents under reaction conditions. The divalent moiety is preferably an aromatic group or alkyl group and more preferably an aromatic group.

Decoupling group (D)—a divalent moiety which links an acylation reaction group to a deactivating group, such as an azole ring, a carbonyl group or a sulfonyl group, and which, due to its composition, structure or both, shields the acylation reactive group from the deactivating influence of the deactivating group sufficiently for the acylation reactive group to react with another acylation reactive group in dehydrating solvent acid. Decoupling groups may comprise, for example, an ether group, a thio group, an aliphatic group, a plurality of aromatic groups and/or sometimes an m-aromatic group. Each decoupling group independently, preferably comprises a plurality of aromatic groups and more preferably further comprises an oxygen or sulfur atom. Each oxygen or sulfur atom is independently preferably an oxygen atom.

If the acylation reactive group is an acid group, then the decoupling group most preferably consists essentially of two aromatic groups linked by an oxygen or sulfur atom.

If the acylation reactive group is an aromatic group, then the decoupling group more preferably comprises two aromatic groups and an oxygen or sulfur atom which either links the two aromatic groups of the decoupling group or links the acylation reactive group to an aromatic group of the decoupling group. The decoupling group most preferably comprises two aromatic groups, a first oxygen or sulfur atom linking the two aromatic groups, and a second oxygen or sulfur atom linking one of the aromatic groups to the acylation reactive group. For instance, the decoupling group and acylation reactive group preferably conform to Formula 3(a):

         3a wherein each Ar is an aromatic group, and each J is an oxygen atom, a sulfur atom or a bond, chosen such that at least one J is an oxygen atom or a sulfur atom. More preferably, each J is an oxygen or sulfur atom. Most preferably, each J is an oxygen atom.

Other examples of suitable decoupling groups include:

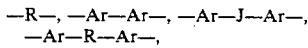         3b wherein each R is an aliphatic moiety, each Ar is an aromatic group, and each J is an oxygen or sulfur atom. Decoupling and suitable decoupling groups are discussed in Colquhoun, "Synthesis of Polyether Ketones in Trifluoromethane Sulfonic Acid," 25 (2) Polymer Preprints 17–18 & Table II (1984): and Colquhoun et al., "Synthesis of Aromatic Polyether Ketones in Trifluoromethane Sulfonic Acid," 29 Polymer 1902 (1988), which are incorporated herein by reference.

Electron-deficient carbon group (Q)—any group containing a carbon atom which can react in the solvent acid with an o-amino-basic moiety to form an azole ring, such as the groups listed in col. 24, lines 59–66 of the 4,533,693 patent, which is incorporated herein by reference, plus ortho esters, metal carboxylate salts, cyano groups and trihalomethyl groups. Preferred electron-deficient carbon groups are carboxylic acids and acid halides. Halogens in electron-deficient carbon groups are preferably chlorine, bromine or iodine and more preferably chlorine.

Solvent acid—any non-oxidizing liquid acid capable of dissolving PBZ polymers, such as methanesulfonic acid, trifluoromethylsulfonic acid, polyphosphoric acid and mixtures thereof. It must be sufficiently non-oxidizing that it does not substantially oxidize AB-, BE-, BN- and BB-monomers which are dissolved therein. Solvent acids are preferably dehydrating acids, such as polyphosphoric acid or a mixture of methanesulfonic acid and phosphorus pentoxide. Polyphosphoric acid preferably has a $P_2O_5$ content by weight of at least about 75 percent, more preferably at least about 78 percent and preferably has a $P_2O_5$ content of at most about 90 percent, more preferably at most about 85 percent. The ratio of methanesulfonic acid to phosphorus pentoxide in mixtures of those compounds is preferably no more than about 20:1 by weight and no less than about 5:1 by weight.

PROCESSES OF THE PRESENT INVENTION

The present invention uses two reactions in a non-oxidizing, dehydrating solvent acid solution to form moieties which link at least two monomers.

One reaction is an aromatic electrophilic substitution, in which acid groups in the monomers react with aromatic groups in the monomers to form aromatic ketone or sulfone moieties linking the monomers. Aromatic electrophilic substitution in a dehydrating solvent acid solution is described in Ueda et al., "Synthesis of Polyketones by Direct Polycondensation of Dicarboxylic Acid with Diaryl Compounds Using Phosphorous Pentoxide/Methane Sulfonic Acid as Condensing Agent and Solvent," 5 Makromol. Chem, Rapid Comm. 833 (1985): Ueda, "Synthesis of Poly(Phenylene Ether Sulfone) by Direct Self-Polycondensation of Sodium 4-Phenoxy Benzene Sulfonate Using Phosphorous Pentoxide/Methane Sulfonic Acid as Condensing Agent and Solvent," 6 Makromol. Chem, Rapid. Comm. 271 (1985): Colquhoun, "Synthesis of Polyether Ketones in Trifluoromethane Sulfonic Acid," 25 (2) Polymer Preprints 17–18 & Table II (1984): and Colquhoun et al., "Synthesis of Aromatic Polyether Ketones in Trifluoromethane Sulfonic Acid," 29 Polymer 1902 (1988), which are incorporated herein by reference.

The Dahl reference names monomers in aromatic electrophilic substitution reactions by adding a prefix to the monomer name with an E- to indicate the presence of an acid group and/or an N- to indicate the presence of an aromatic group which serves as an acylation reactive group. This Application will follow the same convention. For instance, an EE-monomer has two acid groups, and an EN-monomer has an acid group and an aromatic group.

Azole rings and electron-withdrawing moieties such as acid groups and electron-deficient carbon groups tend to deactivate acylation reactive groups with respect to aromatic electrophilic substitution in solvent acid. Therefore, acylation reactive groups in the monomers are preferably linked to azole rings, to azole-forming moieties and to other acylation reactive groups by decoupling groups.

The acylation reactive groups are reacted under any conditions at which the aromatic electrophilic substitution occurs and the reagents and products are stable. The temperature is preferably at least about 20° C., more preferably at least about 40° C. and most preferably at least about 45° C. The temperature is preferably at most about 150° C., more preferably at most about 70° C. and most preferably at most about 55° C. Pressure is not critical, and is conveniently atmospheric pressure. The reaction is highly preferably carried out under inert atmosphere, for example under nitrogen, helium or argon.

In the second reaction, o-amino-basic moieties and electron-deficient carbon groups on the monomers react to form azole rings linking the monomers. Reaction conditions for carrying out such azole ring formation in non-oxidizing dehydrating solvent acid are described in the following references which are incorporated by reference: Sybert et al., *Liquid Crystalline Polymer Compositions, Process and Products*, U.S. Pat. No. 4,772,678 (Sep. 20, 1988): Wolfe et al., *Liquid Crystalline Polymer Compositions, Process and Products*, U.S. Pat. No. 4,703,103 (Oct. 27, 1987); Wolfe et al., *Liquid Crystalline Polymer Compositions, Process and Products*, U.S. Pat. No. 4,533,692 (Aug. 6, 1985); Wolfe et al., *Liquid Crystalline Poly*(2,6-Benzothiazole) *Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985): Imai et al. "Polybenzoxazoles and Polybenzothiazoles," 83 Makromol. Chem. 167 (1965), Evers,

*Thermoxidatively Stable Articulated p-Benzobisoxazole and p-Benzobisthiazole Polymers,* U.S. Pat. No. 4,359,567 (Nov. 16, 1982); Tsai et al., *Method for Making Heterocyclic Block Copolymer,* U.S. Pat. No. 4,578,432 (Mar. 25, 1986) and 11 Ency. Poly. Sci. & Eng., *Polybenzothiazoles and Polybenzoxazoles,* 601 (J. Wiley & Sons 1988).

Following the convention established in the Encyclopedia of Polymer Science reference previously incorporated herein, the presence of an electron-deficient carbon group in a monomer shall be indicated by the letter A, and the presence of an o-amino-basic moiety shall be indicated by the letter B. For instance, BB-monomers contain two o-amino-basic moieties, and AB-monomers contain an electron-deficient carbon group and an o-amino-basic moiety.

The reaction may be carried out under any conditions at which azole rings are formed and the reagents and products are stable. The reaction temperatures are preferably moderate. The reaction temperature is preferably at least about 20° C., more preferably at least about 45° C., more highly preferably at least about 70° C. and most preferably at least about 90° C. Although the reaction may occur as high as 220° C. or more, it is preferably no more than about 150° C., more preferably no more than about 120° C., and most preferably no more than about 100° C. It is often preferable to commence the reaction at a relatively low temperature and increase the temperature as the reaction proceeds. The reaction is highly preferably carried out under vacuum or a non-oxidizing atmosphere, such as nitrogen, helium or argon. If the reaction is carried out under a non-oxidizing atmosphere, the pressure is not critical, but is conveniently about atmospheric pressure or less.

The two reactions may be carried out simultaneously or in either order sequentially, depending upon the monomers chosen and the order in which they are contacted. The reaction to form azole rings is preferably carried out first, and the reaction to form aromatic ketone or sulfone moieties is preferably carried out second, because azole rings are most easily formed at temperatures which may be too high for the aromatic ketone or sulfone moieties and because o-amino-basic moieties may undergo undesirable side reactions with aromatic ketone moieties.

At least two primary monomers are used in the process, and each primary monomer contains at least two functional moieties chosen from the group consisting of azole-forming moieties and acylation reactive groups. At least two of the primary monomers must contain azole-forming moieties which can react to form an azole ring. At least two of the primary monomers must contain acylation reactive groups which can react to form an aromatic ketone or sulfone moiety. At least one of the primary monomers must contain a first functional moiety which can react as an azole-forming moiety and a second functional moiety which can react as an acylation reactive group. All three criteria can be met using as few as two primary monomers since a single primary monomer can contain one of the azole-forming groups called for by the first criterion and one of the acylation reactive groups called for by the second criterion and can thereby fulfill the third criterion.

Suitable primary monomers are preferably chosen from AA-, BB-, AB-, EE-, NN-, EN-, AE-, AN-, BE- and BN-monomers. At least one primary monomer must be an AE-, AN-, BE- or BN- monomer. When a one-step polymerization is used, then the reaction essentially proceeds directly from the primary monomer to the resulting copolymer. When a two-step polymerization is used, then a plurality of primary monomers are reacted to form one or more intermediate monomers, which are condensed to form a copolymer by addition of an additional monomer.

Primary Monomers

AE-monomers preferably comprise:
1. an electron-deficient carbon group;
2. a decoupling group linked to said electron-deficient carbon group; and
3. an acid group bonded to said decoupling group in a position wherein it is capable of reacting with an aromatic group to form an aromatic ketone or sulfone moiety in solvent acid.

The electron-deficient carbon group has the description and preferred embodiments previously defined. It is most preferably a carboxylic acid or acid halide. The acid group has the description and preferred embodiments previously defined. It is highly preferably a carboxylic acid, a sulfonic acid or an acid halide thereof. The electron-deficient carbon group and the acid group are linked by a decoupling group having the description and preferred embodiments previously defined. Each decoupling group individually preferably comprises two aromatic moieties and more preferably further comprises an ether or thioether moiety linking the two aromatic groups.

The AE-monomer preferably conforms to Formula 4(a):

$$Q\text{—}D\text{—}AG \qquad\qquad 4a$$

wherein Q is an electron-deficient carbon group, D is a decoupling group, and AG is an acid group, as each of those moieties is previously described. The AE-monomer more preferably conforms to Formula 4(b):

$$Q\text{—}Ar\text{—}J\text{—}Ar\text{—}AG \qquad\qquad 4b$$

wherein each Ar is independently an aromatic group, and J is an oxygen atom, a sulfur atom or a bond, as those moieties are previously described, and Q and AG have the meaning previously given. Examples of suitable AE-monomers include bis-(4-benzoic acid), oxybis(4-benzoic acid), 1-(4-carboxylic acid phenoxy)-4-(4-sulfonic acid phenoxy)-benzene and the acid halide or esters thereof.

AN-monomers preferably comprise:
1. an electron-deficient carbon group;
2. a decoupling group linked to said electron-deficient carbon group; and
3. an aromatic group bonded to said decoupling group in a position where it is sufficiently active to react with an acid group in solvent acid.

The electron-deficient carbon group, decoupling group and aromatic group have the meaning and preferred embodiments previously defined. The decoupling group highly preferably comprises two aromatic groups and one ether or thioether moiety. It more highly preferably further comprises a second ether or thioether moiety. Each AN-monomer preferably conforms to Formula 5(a):

$$Q\text{—}D\text{—}Ar \qquad\qquad 5a$$

and more preferably conforms to Formula 5(b)

Q—Ar—J—Ar—J—Ar      5b wherein each character has the meaning previously assigned and wherein at least one J is an ether or thioether moiety. Examples of suitable AN-monomers include, 4-phenoxyphenoxybenzoic acid, 4-phenylphenoxybenzoic acid, and acid halides or esters thereof.

BE-monomers preferably comprise:
1. a first aromatic group:
2. an o-amino-basic group bonded to said aromatic group: and
3. an acid group linked to said aromatic group such that it is capable of reacting with an aromatic group in solvent acid.

The aromatic group, the o-amino-basic group, and the acid group all have the definitions and preferred embodiments previously defined. BE-monomers preferably further comprise a decoupling group linking the acid group to the aromatic moiety. The decoupling group highly preferably comprises a second aromatic group and more highly preferably comprises an oxygen or sulfur atom linking the first and second aromatic groups. BE-monomers preferably conform to Formula 6(a)

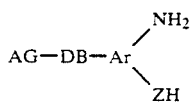      6a and more preferably conform to Formula 6(b):

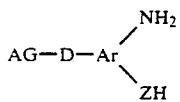      6b and most preferably conform to Formula 6(c):

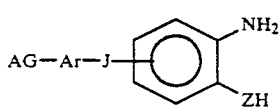      6c wherein Z has the meaning previously given in defining azole rings, DB is either a decoupling group or a bond, and all other characters have the meaning and preferred embodiments previously given.

(For the purpose of this application, when the amine groups and Z moieties of a monomer are depicted as bonded to an aromatic group without indicating their position, as in Formulae 6(a)-(b), it shall be understood that:
(1) each amine group is ortho to one Z moiety: and
(2) if the monomer has two o-amino-basic moieties, one primary amine group and Z moiety may be in either cis position or trans position with respect to the other amine group and Z moiety, as illustrated in Formulae 7(a)-(b) and as described in 11 Ency. Poly. Sci. & Eng., supra, at 602, which is incorporated herein by reference.

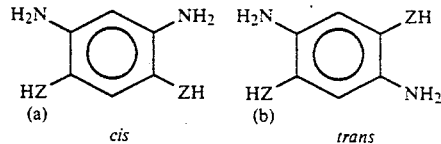

The same understandings apply with respect to nitrogen atoms and Z moieties in an azole ring fused to an aromatic moiety, as illustrated in 11 Ency. Poly. Sci. & Eng., supra. at 602, which is incorporated herein by reference.)

Examples of suitable BE-monomers are found in Table 8, col. 33-35 of U.S. Pat. No. 4,533,693, which is incorporated herein by reference. Other suitable monomers, for instance 4-(3-amino-4-hydroxyphenoxy)-benzoic acid and obvious variations thereof, can be synthesized by substitution of reagents into the processes described therein.

BN-monomers preferably comprise:
1. a first aromatic group:
2. an o-amino-basic moiety bonded to said aromatic group: and
3. a second aromatic group linked to said first aromatic group by a bond or a decoupling moiety such that it is capable of reacting with an aromatic group in solvent acid.

The first and second aromatic groups and the o-amino-basic moiety have the description and preferred embodiments previously given. The decoupling group has the broad description previously given; but preferably comprises an aliphatic moiety, an ether moiety or a thioether moiety: more preferably comprises an ether moiety or a thioether moiety: and most preferably consists of an ether moiety. BN-monomers preferably conform to Formula 8(a)

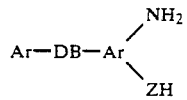      8a and more preferably conform to Formula 8(b):

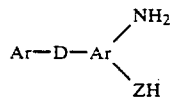      8b and most preferably conform to Formula 8(c):

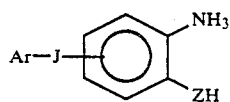      8c wherein J is an oxygen atom, a sulfur atom or a bond and all other characters have the meaning and preferred embodiments previously given.

AA-, BB- and AB-monomers are all familiar to persons of ordinary skill in the art of polybenzazole chemistry. AA-monomers contain two electron-deficient carbon groups linked by a divalent organic moiety which is inert under reaction conditions. Electron-deficient carbon groups conform to the definitions and preferred embodiments previously set out. The divalent organic moiety preferably comprises a saturated aliphatic moiety or an aromatic group, more preferably comprises an alkyl group or two aromatic moieties and most preferably comprises two aromatic moieties linked by an oxygen atom. Examples of suitable AA-monomers are set out in U.S. Pat. No. 4,533,693, col. 25-32, Tables 4-6, which are incorporated herein by reference. Preferred AA-monomers include bis-(4-benzoic acid), oxy-bis-(4-benzoic acid) and acid halides or esters thereof. AA-monomers preferably conform with formula 9(a):

    9a wherein DM is a divalent moiety as previously described in defining benzazole moieties and Q is an electron-deficient carbon group.

BB-monomers preferably comprise:
1. an aromatic group
2. a first o-amino-basic moiety bonded to said aromatic group: and
3. a second o-amino-basic moiety bonded to said aromatic group. The aromatic group and o-amino-basic moieties have the meaning and preferred embodiments previously defined. The BB-monomer preferably complies with Formula 10:

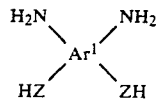    10 wherein:
$Ar^1$ is an aromatic moiety as previously described: and each Z conforms to the definition and preferred embodiments previously given in describing azole rings. Suitable examples of BB-monomers are described in U.S. Pat. No. 4,533,693, columns 19-24, Tables 1-3. Highly preferred monomers include 4,6-diaminoresorcinol, 2,5-diaminohydroquinone, 1,4-dithio-2,5-diamino-benzene and acid salts thereof.

AB-monomers preferably comprise:
1. an aromatic group
2. a first o-amino-basic moiety bonded to said aromatic group: and
3. an electron-deficient carbon group linked to said aromatic group.

The electron-deficient carbon group may be bonded directly to the aromatic group in the monomer or may be linked to the aromatic group by a moiety such as an aliphatic or aromatic moiety which is inert with respect to all reagents under reaction conditions. AB-monomers preferably conform with Formula 11(a):

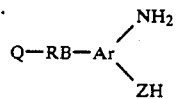    11a and more preferably conform with Formula 11(b):

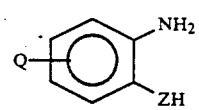    11b wherein RB is either a bond or an aliphatic or aromatic moiety which is inert under polymerization conditions, and all characters have the meaning and preferred embodiments previously given. Examples of suitable AB-monomers are shown in U.S. Pat. No. 4,533,693, col. 32-35, Tables 7-8. Preferred examples include 3-amino-4-hydroxybenzoic acid, 3-hydroxy-4-aminobenzoic acid, 3-mercapto-4-aminobenzoic acid, and the acid halides or esters thereof.

EE-, NN- and EN-monomers are familiar to persons of ordinary skill in the art of aromatic electrophilic substitution chemistry. EE-monomers preferably comprise two acid groups linked by a decoupling group. The acid groups and the decoupling group each independently have the meanings and preferred embodiments previously defined. EE-monomers preferably comply with Formula 12(a):

    12a and more preferably comply with Formula 12(b):

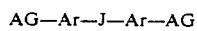    12b wherein all characters have the meanings and preferred embodiments previously assigned. Preferred EE-monomers include bis-(4-benzoic acid), oxy-bis-(4-benzoic acid) and the acid halides of those monomers.

NN-monomers comprise two aromatic groups linked by a decoupling group. The aromatic groups have the meaning and preferred embodiments previously given. The decoupling group has the broad definition previously given. The decoupling group preferably comprises an aromatic group and at least one ether or thioether moiety. It more preferably comprises an aromatic group and two ether or thioether moieties and most preferably comprises an aromatic group and two ether moieties. Suitable NN-monomers preferably comply with Formula 13(a)

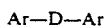    13a and more preferably comply with Formula 13(b):

    13b wherein each J is independently an oxygen atom, a sulfur atom or a bond, and x is a number of repeating units and all other characters have the meaning and preferred embodiments previously defined. x preferably averages at least about 1 and preferably averages no more than about 6, more preferably no more than about 2 and most preferably no more than about 1. Examples of preferred NN-monomers include m-diphenoxybenzene, p-diphenoxybenzene, p-phenoxybiphenyl and 4,4'-diphenoxybiphenyl.

EN-monomers comprise an acid group and an aromatic group linked by a decoupling group. The acid group, the aromatic group and the decoupling group all have the meanings and preferred embodiments previously defined. The acid group and the aromatic group should be bonded to the decoupling group in a position where they remain sufficiently active to react in solvent acid to form a polymer. EN-monomers preferably conform with Formula 14(a):

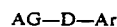    14a and more preferably conform with Formula 14(b):

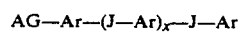    14b wherein each character has the meaning and preferred embodiments previously described and at least one J is an oxygen or sulfur atom.

As is readily apparent, there is some overlap in the previously described monomers. Carboxylic acid and acid halide moieties are highly preferred embodiments of both acid groups and electron-deficient carbon groups. Therefore, bis-(4-benzoic acid), oxy-bis-(4-benzoic acid) and their acid halides can serve as AA-monomers, EE-monomers or AE-monomers. 3-amino-4-hydroxybenzoic acid and related compounds can be both AB-monomers and BE-monomers. This dual action of carboxylic acid induces randomness in polymers synthesized using monomers which contain carboxylic acid or acid halides. Such randomness can be eliminated or minimized, if desired, by obvious choices of monomers to avoid functional groups which can react in more than one way and/or by adjusting reaction conditions to favor one reaction over the other.

The primary monomers described previously are either known and commercially available or can be synthesized by known methods. Diphenoxybenzene, bis-(4-benzoic acid) and oxy-bis-(4-benzoic acid) are commercially available.

EE-, NN- and EN-monomers can be synthesized by obvious variations on known reactions, such as are taught in the Colquhoun references and in Sutherlin et al., "Rigid-Rod Polyquinolines with Extended Aryl Ether Pendent Groups," 18 *Macromolecules* 2669, 2670, 2673–74 (1985), which is incorporated herein by reference. The same processes and obvious variations may be used to synthesize AE- and AN-monomers. In the Sutherlin reference, a benzoate ester having a hydroxyl group bonded to the benzene ring is reacted with a halogenated aromatic moiety in the presence of an alkali metal alkoxide to form the corresponding aromatic ether having an ester moiety. The ester can be converted to an acid, acid halide or cyano moiety by known processes.

Sources and synthesis for AA-, BB- and AB-monomers are given in U.S. Pat. No. 4,533,693 col. 19–35, Tables 1–8; in Lysenko, *High Purity Process for the Preparation of 4,6-Diamino-1,3-Benzenediol*, U.S. Pat. No. 4,766,244 (Aug. 23, 1988): in Lysenko, *Preparation of 3-Amino-4-Hydroxybenzoic Acids*, U.S. Pat. No. 4,835,306 (May 30, 1989): and in Inbasekaran, *Preparation of Diamino- and Dialkylaminobenzenediols*, U.S. Pat. No. 4,806,688 (Feb. 21, 1989), which are incorporated herein by reference. The same reactions and obvious variations thereof can be used to synthesize BE- and BN-monomers.

Copolymerization of monomers

The previously described primary monomers are copolymerized under the conditions previously described by condensing azole-forming moieties to form azole rings linking the monomers and by condensing acylation reactive groups to form aromatic ketone or sulfone moieties linking the monomers. The reaction takes place in a non-oxidizing and dehydrating solvent acid which is preferably either polyphosphoric acid or a mixture of methanesulfonic acid and phosphorus pentoxide. The acid is more preferably a mixture of methanesulfonic acid and phosphorus pentoxide. Mixtures of suitable acids may also be used.

The two condensation reactions may be carried out simultaneously. For appropriate groups of monomers, the two reactions may also be carried out sequentially. Preferably, the azole-forming reaction is carried out first, and the aromatic electrophilic substitution, second. This can be accomplished, for instance, by first reacting two or more monomers which contain o-amino-basic moieties, electron-deficient carbon groups and acid groups, and second adding a monomer which contains aromatic acylation reactive groups. Examples of such sequential reactions are described hereinafter, and should be apparent to persons of ordinary skill in the art.

The monomers are chosen such that they form a copolymer containing both azole rings and aromatic ketone and/or sulfone moieties. At least some monomers must be AE-, AN-, BE- or BN-monomers. The monomers preferably contain about equimolar quantities of o-amino-basic moieties and electron-deficient carbon groups and about equimolar quantities of acid groups and reactive aromatic groups. The decoupling groups and/or divalent organic moieties of the monomers may contain units ordinarily associated with other polymers, such as amide, imide or other moieties which are stable in the acid and do not interfere with the condensation of the monomers.

Copolymerizations of the present invention may optionally be carried out using only two monomers. Suitable two monomer reactions comprise the reaction of AN-monomer and BE-monomer or the reaction of AE-monomer and BN-monomer. The two monomer reactions preferably conform to one of Formula 15(a)-(b):

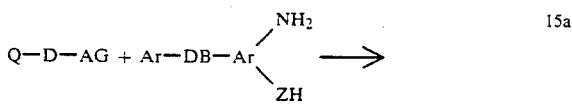

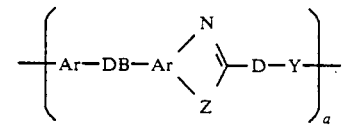

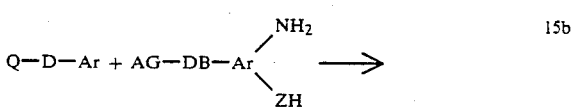

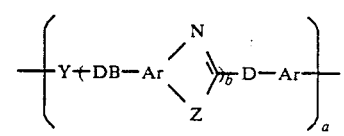

and more preferably conform to one of Formula 15(c)–(d):

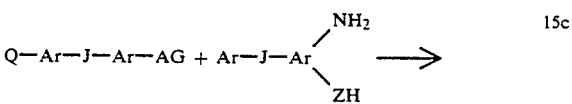

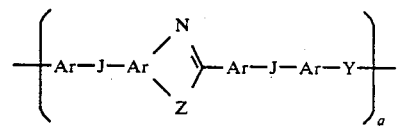

-continued

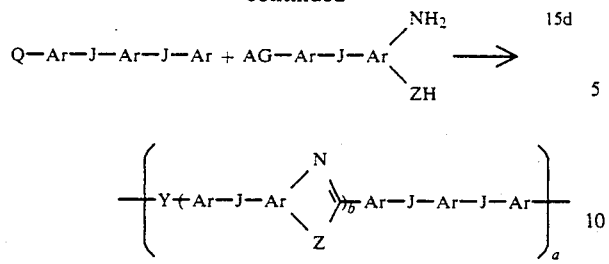

15d $$\left\{Y+Ar-J-Ar\underset{Z}{\overset{N}{\diagdown}}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\right\}_a$$

wherein each Y is individually a carbonyl moiety or a sulfonyl moiety, each a is a number of repeating units in excess of 1, each b is a number of units averaging more than 0 and less than 10, and all other characters have the meaning and preferred embodiments previously given. The variation in b from unit to unit exemplifies the point made previously that carboxylic acid and its acid halides can act as electron-deficient carbon groups or acid groups, causing some random placement of moieties within the structure of the copolymer. Both monomers in Formulae 15(b) and 15(d) can self-polymerize if Q and AG are carboxylic acid or an acid halide. Therefore, the copolymer may have several benzazole moieties in a row without intervening aromatic ketone moieties, or several aromatic ketone or sulfone moieties without intervening benzazole moieties.

The reactions of AN- and BE-monomers or AE- and BN-monomers are usually one-step reactions in which azole ring formation and aromatic electrophilic substitution proceed essentially simultaneously. Such copolymerization is not ordinarily as effective as sequential copolymerization for making high molecular weight copolymer. The reaction temperature is preferably near the high end of what is preferred for aromatic electrophilic substitution and near the low end of what is preferred for azole ring formation.

The copolymerization can also be carried out using three or more monomers. The copolymerizations may be carried out by simultaneously forming azole rings and aromatic ketone or sulfone moieties form the copolymer. The azole rings and aromatic ketone or sulfone moieties are preferably formed sequentially by first reacting at least two monomers to form dimers or oligimers containing one of those moieties but not both, and second adding at least on more monomer which links those dimers or oligimers by reacting to form the other moiety.

The copolymerization preferably uses three different types of primary monomer. Examples include the copolymerization of AE-, BE- and NN-monomers as in Formula 16(a):

16a the copolymerization of AE-, BB- and NN-monomers as in Formula 16(b):

16b the copolymerization of AN-, BN- and EE-monomers as illustrated in Formula 16(c):

16c the copolymerization of AN-, BB- and EE-monomers as illustrated in Formula 16(d):

16d the copolymerization of AA-, BN- and BE-monomers, as illustrated in Formula 16(e):

16e the copolymerization of AA-, BN- and EE-monomers as illustrated in Formula 16(f):

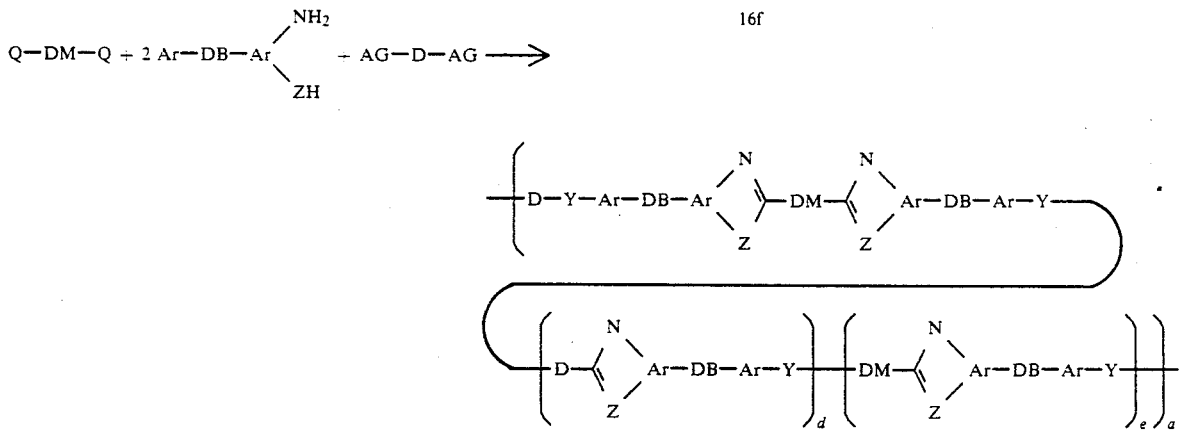

16f the copolymerization of AA-, BE- and NN-monomers as illustrated in Formula 16(g):

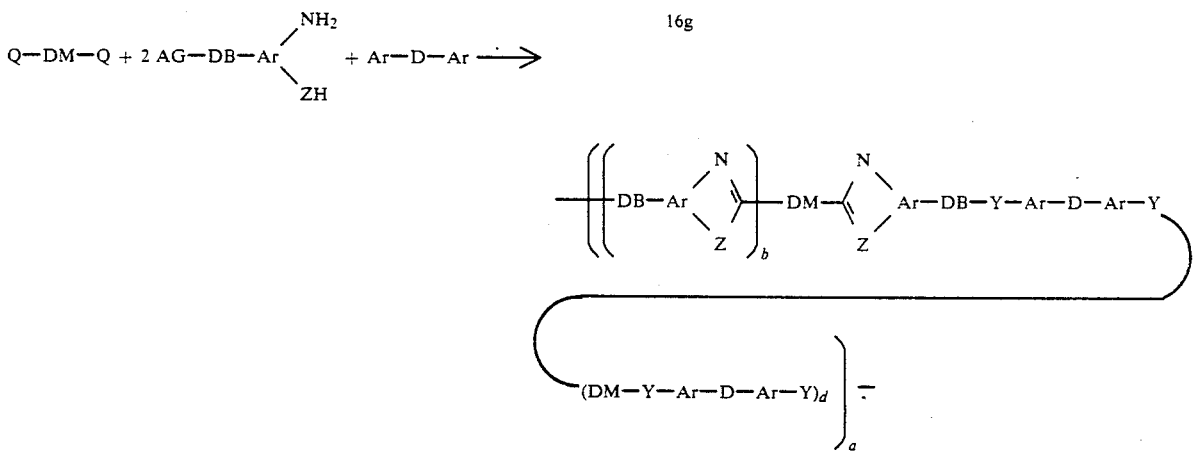

16g and the copolymerization of AE-, AN- and BB-monomers as illustrated in Formula 11(h):

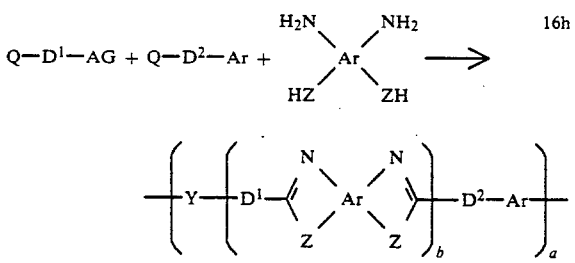

16h wherein each b and c is independently a number of repeating units averaging greater than 0 and less than 10, each d and e is independently a number of repeating units averaging from 0 to 10 and all other characters have the meaning and preferred embodiments previously given.

Each of the copolymer structures shown previously may have a great degree of randomness when the acid groups and/or electron-deficient carbon groups in the monomers are carboxylic acids or acid halides. The most common variations in structure are represented by varying b, c, d and e, b and c preferably average more than 0.1 and more preferably more than 0.5. b and c preferably average less than 5, more preferably less than 3. b and c most preferably average about 1. d and e preferably independently average at most about 5, more preferably at most about 0.5 and more highly preferably at most about 0.1. d and e most preferably average about 0. Persons of ordinary skill may recognize other random variations in structure which may occur that are not specifically reflected in the Formulae shown previously.

The process of the present invention preferably utilizes reactions of AE-, BE- and NN-monomers as illustrated in Formula 16(a); AN-, BN- and EE-monomers as illustrated in Formula 16(c); or AN-, BB- and EE-monomers as illustrated in Formula 16(d). Preferred reactions more preferably conform to one of Formulae 17(a)-(d)

AE-, BE- and NN-

17a

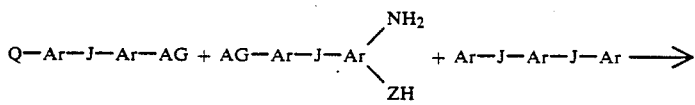

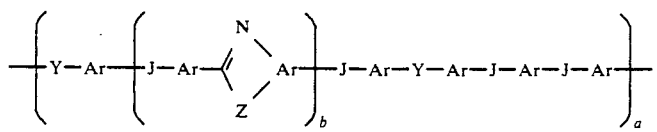

17b

AE—, BB— and NN—

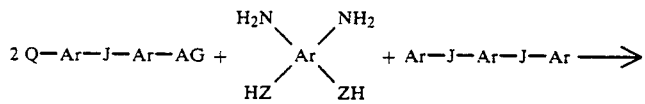

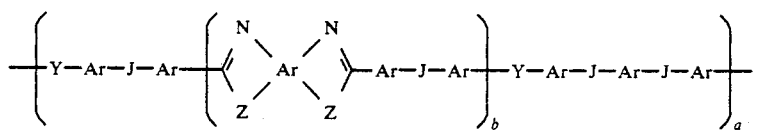

17c

AN—, BN— and EE—

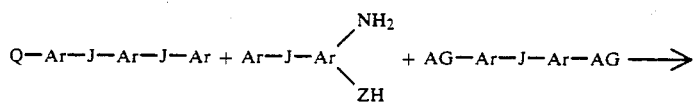

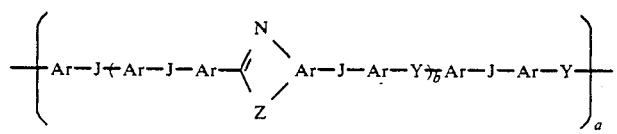

17d

AN—, BB— and EE—

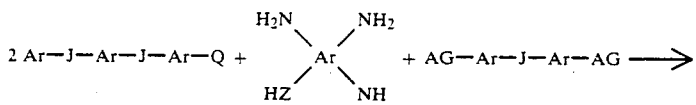

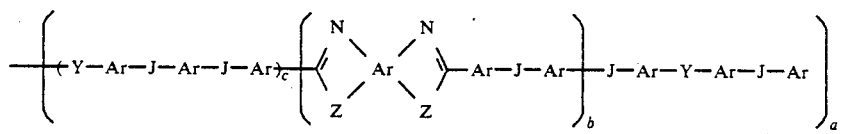

The most preferred copolymerization is that of AE-, BB- and NN-monomers. It most preferably conforms to Formula 18:

the meaning previously given. Bonds to aromatic groups are preferably in meta or para position, and more preferably in para position, with respect to each

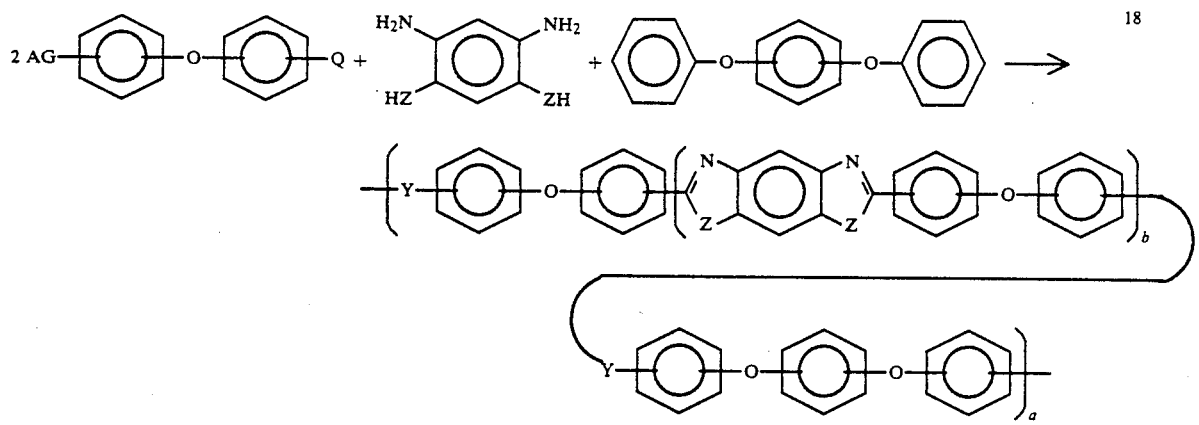

18 wherein b is a number of repeating units averaging less than 10 and greater than 0, each Q is a carboxylic acid or acid halide, and each AG is a carboxylic acid, sulfonic acid or acid halide, and all other characters have other. Acid groups are most preferably carboxylic acid or acid halide, and Y is most preferably a carbonyl group.

The previously described reactions of primary comonomers may be varied in ways obvious to persons of ordinary skill in the art to provide copolymers containing obvious variations. For instance, the azole ring content of the resulting copolymer may be increased by adding AB-monomer or AA- and/or BB-monomer. The poly(aromatic ketone or sulfone) content of the resulting copolymer may be increased by adding EN-monomer or EE- and/or NN-monomer. The additional monomers preferably make up no more than 50 percent by weight of the monomer mixture, more preferably no more than about 10 percent by weight of the monomer mixture. Most preferably no additional primary monomers are added.

Mixtures of AB-, BB-, BE- and/or BN- monomers containing different o-amino-basic moieties may be copolymerized to form copolymers containing mixtures of benzoxazole, benzothiazole and/or benzimidazole moieties. Mixtures of AE-, BE-, EE- and EN-monomers containing different acid groups may be copolymerized to form copolymers containing both aromatic ketone and aromatic sulfone moieties. Monofunctional reagents may be copolymerized in small quantities with the monomers to serve as end-capping groups, as described in U.S. Pat. No. 4,703,103 and in PCT Publ. WO 86/02368 on Page 30–31, which are incorporated herein by reference. Molecular weight may also be controlled by adding an excess of a monomer which can not undergo side reaction to remove the excess.

The previous discussion has repeatedly pointed out that copolymers of the present invention ordinarily have only an average structure containing local variation. This is because carboxylic acid and its derivatives can act as either electron-deficient carbon groups or acid groups. For instance, oxy-bis-(4-benzoic acid) can function as an AA-monomer, an AE-monomer or an EE-monomer. In the presence of two primary BB-monomers, four oxy-bis-(4-benzoic acid) molecules can react to form either the two intermediate structures illustrated in Formula 19(a):

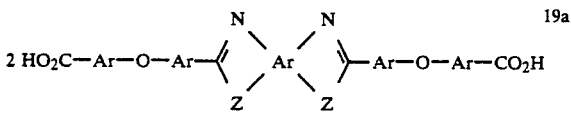

or the two intermediate structures illustrated in Formula 19(b):

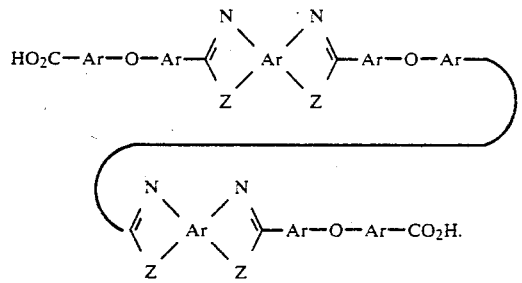

The stoichiometry of the reaction is not upset because the intermediates in both formulae 19(a) and 19(b) are two intermediates terminated with two acid groups each. Both the intermediates of Formula 19(a) and the intermediates of Formula 19(b) react with NN-monomers to provide the copolymer illustrated in Formula 17(b) in which each J is an oxygen atom and b averages 1. However, the intermediates of Formula 19(a) provide two mer units in which b equals one, whereas the intermediates in Formula 19(b) provide a mer unit in which b is 0 and a mer unit in which b is 2.

Similar obvious structural variations may be discerned in other sets of monomers without undue experimentation, and similar obvious structural variations may cause the formation of intermediate oligimers having more than two repeating units. Furthermore, the stoichiometric ratio of comonomers may be adjusted to shift the average value of b up or down. For instance, oxy-bis-(4-benzoic acid) reacts with BB-monomer in a 2:1 molar ratio to form intermediates having the average structure shown in Formula 19(a) and copolymer having the structure of Formula 17(b) wherein b averages 1. If, on the other hand, the molar ratio is 3:2, then the intermediate has the average structure shown in Formula 19(c)

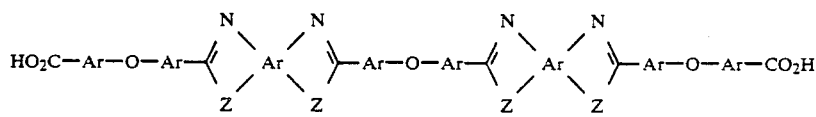

and the copolymer has the structure of Formula 17(b) wherein b averages 2. If the molar ratio of oxy-bis-(4-benzoic acid) to BB-monomer is greater than 2:1, the copolymer may average less than one benzazole unit per mer unit (b is on average less than 1).

Other monomers containing carboxylic acid or derivatives may also react using "non-stoichiometric" amounts to adjust the benzazole or aromatic ketone content of the copolymer. The average number of benzazole mer units (b) in the benzazole moiety of each copolymer unit should be less than 10 and is preferably at most about 5, more preferably at most about 3, more highly preferably at most about 2 and most preferably at most about 1. The average should be greater than 0 and is preferably at least about 0.5, more preferably at least about 0.75 and most preferably at least about 1.

Two-step copolymerization process utilizing intermediate AA-, BB-, EE- or NN-monomers The copolymerization is preferably carried out in a two-step fashion. In a first step, two primary monomers which can link by either azole condensation or aromatic electrophilic substitution, but not both, are reacted to form an intermediate AA-, BB-, EE- or NN-monomer. In a second step, the intermediate monomer is contacted with a compatible AA-, BB-, EE- or NN-monomer under conditions in which azole ring formation or aromatic electrophilic substitution occur, whereby a copolymer is formed.

In a less preferred embodiment, the first step comprises an aromatic electrophilic substitution step and produces an intermediate AA- or BB-monomer suitable for copolymerization by known processes for making polybenzazole polymers. For instance, AE-monomers can react with NN-monomers or AN-monomers to produce intermediate AA-monomers, as illustrated in Formulae 20(a)-(b):

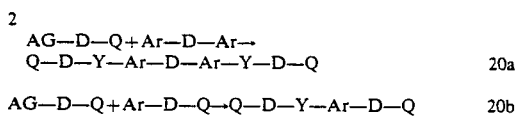

or BE-monomers can react with NN- or BN monomers to produce intermediate BB-monomers, as illustrated in Formulae 21(a) and (b):

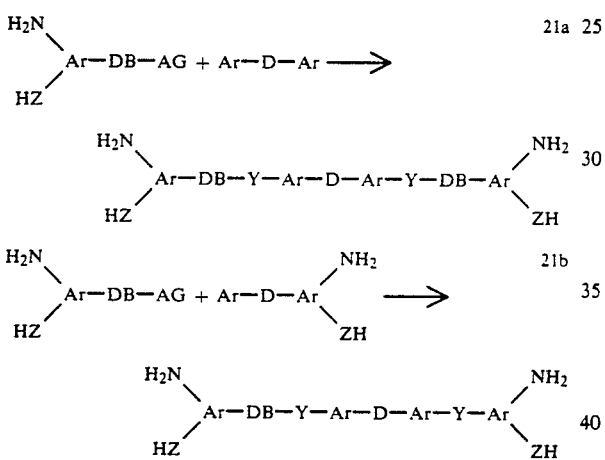

wherein all characters have the meaning and preferred embodiments previously described. As previously described, the monomer may also containing repeating AB-benzazole moieties if the acid group is carboxylic acid due to self-polymerization of the BE-monomer. Other examples of these reactions include the reaction of AN- or BN-monomers with EE-monomers.

The resulting intermediate monomer may be isolated and purified by known methods, but it is preferably reacted in situ with an AA- or BB-monomer under conditions suitable for the formation of azole rings. For instance, an intermediate BB-monomer can react with a primary or intermediate AA-monomer to provide an appropriate copolymer. The intermediate monomer is preferably an intermediate AA-monomer which reacts with a primary or intermediate BB-monomer. Intermediate monomers are preferably reacted with primary monomers. Due to potential instability in the aromatic ketone or sulfone moieties, the maximum temperature for the second (azole-forming step) has the maximum preferred temperature previously set out for aromatic electrophilic substitution.

Preferably, the azole ring is formed during the first step, such that an intermediate EE- or NN-monomer is formed. For instance, intermediate NN-monomers can be formed by the reaction of AN-monomers with BB-monomers, or AN-monomers with BN-monomers, or BN-monomers with AA-monomers, as illustrated in Formulae 22(a)-(c):

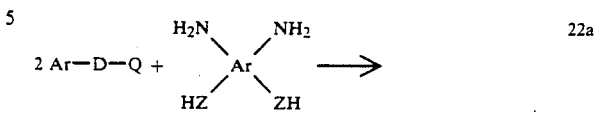
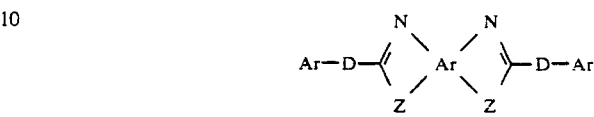
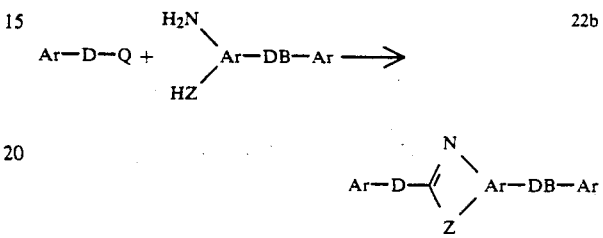
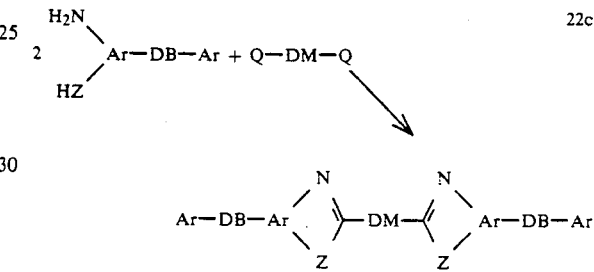

wherein all characters and monomers have the meanings and preferred embodiments previously given. Intermediate EE-monomers can be synthesized by the reaction of BE-monomers with AA-monomers, or by the reaction of BE-monomers with AE-monomers, or by the reaction of BB-monomers with AE-monomers, as illustrated in Formula 23(a)-(c):

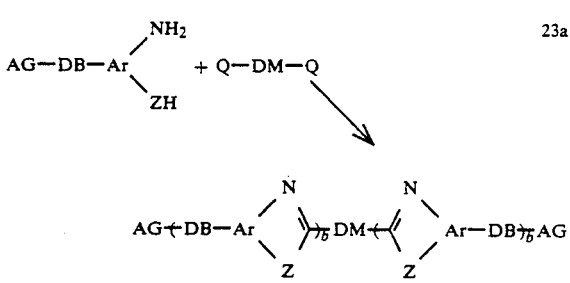
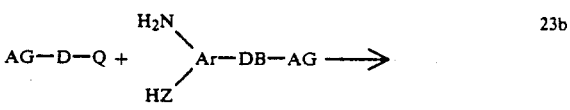
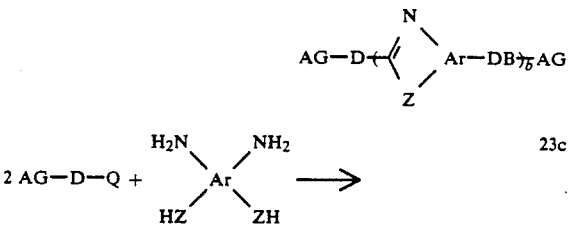

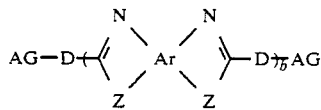

Each of the intermediate NN- or EE-monomers previously described may contain repeating benzazole or aromatic ketone mer units due to the dual action of carboxylic acid and its derivatives, as previously described.

Each intermediate NN-monomer preferably comprises:
(1) a benzazole moiety containing:
 (a) at least one first aromatic group; and
 (b) at least one azole ring fused to each said first aromatic group:
(2) at least one decoupling group linked to the 2-carbon of at least one azole ring in said benzazole moiety:
(3) a first aromatic group linked to said decoupling group in a position wherein it is capable of reacting with an acid group in a solvent acid solution: and
(4) a second aromatic group linked to the benzazole moiety either by a bond to a first aromatic group of the benzazole moiety or by a second decoupling group which is bonded to an aromatic group or to the 2-carbon of an azole ring in the benzazole moiety.

Each intermediate EE-monomer preferably comprises:
(1) a benzazole moiety as that term is previously defined:
(2) at least one decoupling group linked to the 2-carbon of at least one azole ring in said benzazole moiety:
(3) a first acid group linked to said decoupling group in a position wherein it remains sufficiently active to react in a solvent acid solution: and
(4) a second acid group bonded to either a first aromatic group (Ar¹) of said benzoxazole moiety or to a second decoupling group which is bonded to an azole ring of said benzoxazole moiety, in a position wherein it remains sufficiently active to react in a solvent acid solution.

Intermediate EE-monomers more preferably comprise:
(1) a benzazole moiety containing at least an AA/BB benzazole unit;
(2) a first and a second decoupling group, each of which comprises a first aromatic group bonded to the 2-carbon of an azole ring of said benzazole moiety and a second aromatic group linked to said first aromatic group:
(3) a first acid group bonded to the second aromatic group of said first decoupling group: and
(4) a second acid group bonded to the second aromatic group of said second decoupling group.

Each decoupling group more highly preferably comprises an oxygen atom, sulfur atom or bond linking the first and second aromatic groups, and most preferably comprises an oxygen atom linking the first and second aromatic groups.

Intermediate EE-monomers preferably independently conform to Formula 24(a)

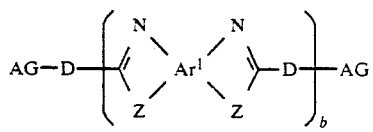

more preferably conform to Formula 24(b)

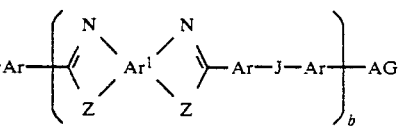

and most preferably conform to Formula 24(c)

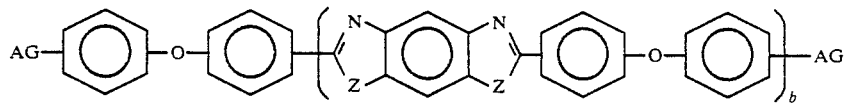

or the trans-PBZ variation thereof, wherein all characters have the meanings previously given. Bonds to aromatic groups, except for the first aromatic group (Ar¹) are preferably in meta or para position with respect to each other and more preferably in para position with respect to each other.

The intermediate EE- and NN-monomers of the present invention are copolymerized by aromatic electrophilic substitution in the manner and under conditions previously described. The monomers may be isolated, but are preferably reacted in situ. For instance, an intermediate EE-monomer of the present invention may be formed in a first reaction, and then a primary NN-monomer, such as diphenoxybenzene, may be added to react with that monomer and form copolymer in the second reaction.

Intermediate EE-monomers and intermediate NN-monomers may be copolymerized together, but preferably either the EE- or the NN-monomer is a primary monomer. More preferably, an intermediate EE-monomer is reacted with a stoichiometric amount of primary NN-monomer.

Of course, obvious variations of the condensation may be practiced to yield obvious variations in the resulting copolymer. Some EN-monomer, containing both an acid group and an aromatic group, may be copolymerized with essentially stoichiometric quantities of EE- and NN-monomer to form a random copolymer having units which reflect both EE/NN- and EN-monomer structure. Examples of EN-monomers include phenoxyphenoxybenzoic acid, phenylphenoxybenzoic acid, and the acid halides or esters thereof. The benzazole moiety of a single monomer may contain both AB- and AA/BB-PBZ structures, or may contain mixtures of benzoxazole, benzothiazole and/or benzimidazole units. Mixtures of monomers may be used in which some monomers contain AB-PBZ units and others contain AA/BB-PBZ units.

Intermediate EE- and/or NN-monomers react with primary EE-, NN- and/or EN-monomers which contain amide or imide linkages, such that terpolymers are formed containing benzazole moieties, aromatic ketone or sulfone moieties, and amide or imide moieties. If such primary monomers are used, they preferable comprise amide moieties. They more preferably comprise two amide moieties which link an aromatic or aliphatic moiety to two aromatic moieties or decoupling groups.

Copolymers Produced Using Processes and/or Monomers of the Invention

The structure of the copolymers reflects the structure of the monomers which are used to synthesize it. The copolymer contains a plurality of mer units which comprise
(1) a benzazole moiety as previously described:
(2) at least one decoupling group linked to the 2-carbon of at least one azole ring in said benzazole moiety:
(3) a linking group bonded to said decoupling group, said linking group comprising an aromatic group and either a carbonyl moiety or a sulfonyl moiety: and
(4) either a bond or a decoupling group linking said benzazole moiety to the linking group of an adjacent mer unit.

Each mer unit preferably comprises two decoupling groups. Within each linking group, the carbonyl or sulfonyl moiety is preferably bonded to the linking group which is bonded to the 2-carbon of an azole ring.

The copolymer may also contain mer units which do not contain a benzazole moiety. Preferably at least about 5 percent of the mer units contain a benzazole moiety, more preferably at least about 10 percent of the mer units contain a benzazole moiety, more highly preferably at least about 25 percent of the mer units contain a benzazole moiety, and most preferably at least about 50 percent of the mer units contain a benzazole moiety. The average number of benzazole units within each mer unit is preferably at least about 0.1, more preferably at least about 0.5 and most preferably at least about 1. The average number of benzazole units within each mer unit should be less than 10, is preferably not more than 5, is more preferably no more than 3, is more highly preferably no more than 2 and is most preferably about 1.

Polymers containing AA/BB-benzazole of the present invention preferably contain a plurality of mer units which comprise
(1) an AA/BB-benzazole moiety as previously described:
(2) two decoupling groups, one bonded to the 2-carbon in each of two azole rings in the benzazole moiety;
(3) two linking groups, as previously described, one bonded to each decoupling group: and
(4) a decoupling group bonded to one of the linking groups.

Polymers synthesized by the reaction of an intermediate EE-monomer and a primary NN-monomer preferably conform to Formula 25(a), more preferably to Formula 25(b)

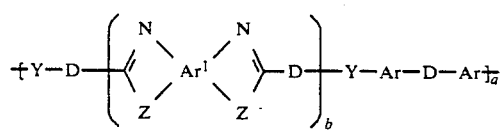
25a

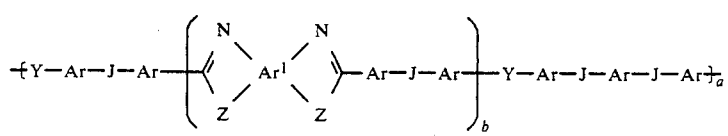
25b and most preferably to Formula 25(c)

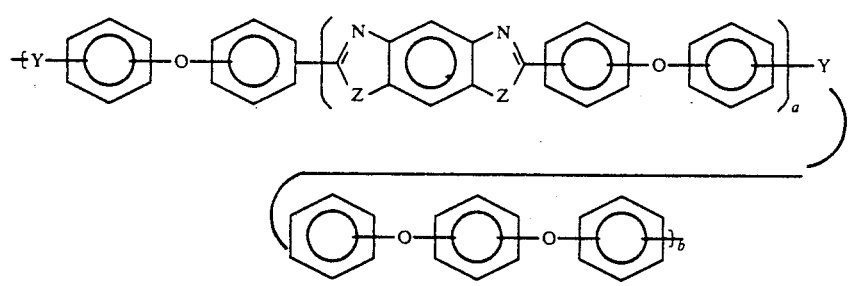
25c wherein all characters have the meaning previously set out and each a is a number of benzazole units from 0 to 10 having an average value greater than 0 and less than 10, which is preferably at least about 0.1 and at most about 5, more preferably at least about 0.5 and at most about 3, and most preferably at least about 1 and at most about 2.

Polymers synthesized by the reaction of an intermediate NN-monomer and a primary EE-monomer preferably complies with Formula 26(a)

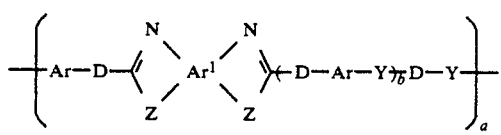
26a more preferably complies with Formula 26(b)

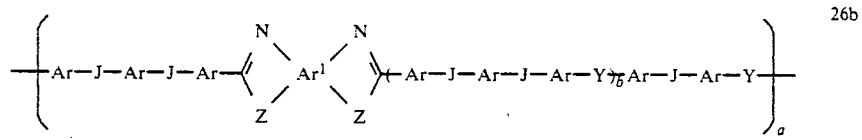
and most preferably complies with Formula 26(c)
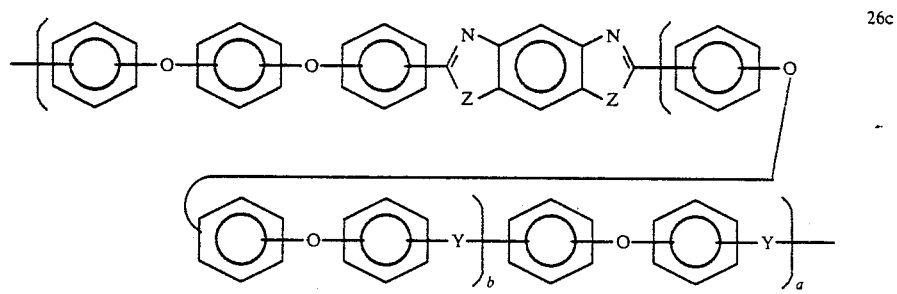
wherein all characters have the meaning previously assigned.
Polymers synthesized using intermediate EE- and intermediate NN-monomers preferably conform to Formula 27(a)
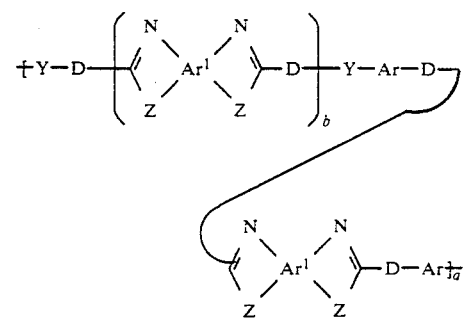
more preferably conform to Formula 27(b)
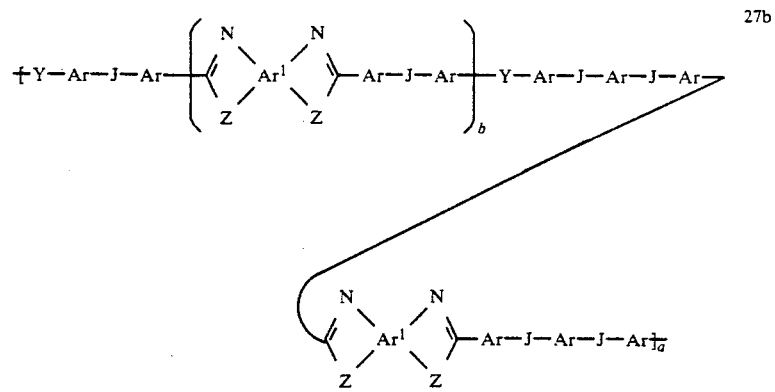
and most preferably conform to Formula 27(c)
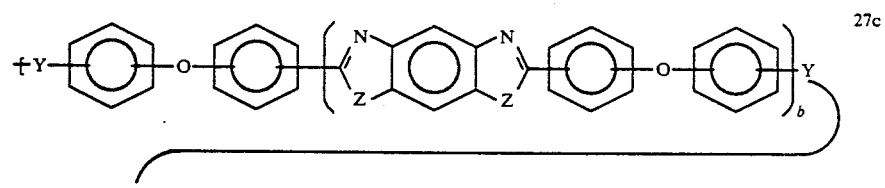

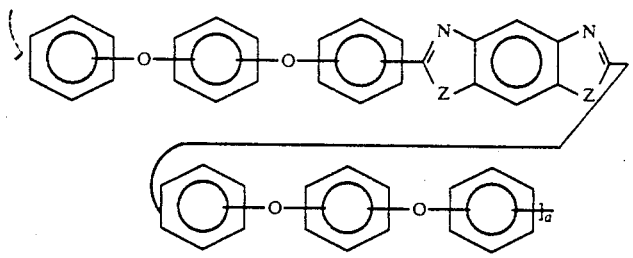

The copolymer is formed in a dope with solvent acid such as methanesulfonic acid and phosphorous pentoxide, or polyphosphoric acid. The copolymers may be precipitated from the dope by contacting the acid with a diluent, such as water. The dope may be used to fabricate fibers and films of the copolymer by a dry jet wet spinning process such as is described in 11 Ency. Poly. Sci. & Eng., supra, at 625–28: U.S. Pat. No. 4,533,693 at Columns 82–84; Hwang et al., "Solution Processing and Properties of Molecular Composite Fibers and Films," 23 Poly. Eng. & Sci. 784, 785 (1984): and Hwang et al., "Composites on a Molecular Level: Phase Relationships, Processing, and Properties," B22(2) J. Macromol. Sci.-Phys. 231, 234–35 (1983), which are incorporated by reference. Fibers, films and other shaped articles have good thermal stability and high strength and are thermoplastic. Films can be pressed into laminates and other forms of copolymer may be pressed into shaped articles by molding at a temperature at or above the glass transition temperature. The processes of the present invention may be carried out in the presence of non-end-capped polybenzazole blocks containing at least 10 mer units to synthesize block copolymers containing polybenzazole blocks and polybenzazole/-poly(aromatic ketone or sulfone) random copolymers, as described in copending application Ser. Nos. 256,338, filed Oct. 12, 1988, and 327,925, filed Mar. 23, 1989.

ILLUSTRATIVE EMBODIMENTS

The current examples are for illustrative purposes only and shall not be taken as limiting either the specification or the claims in any way. Unless stated otherwise, all parts and proportions are by weight.

SYNTHESIS OF REAGENTS (not examples of the invention)

Example A

Synthesis of Methyl 4-(4-Phenoxyphenoxybenzoate): EN- or AN-monomer

Methyl 4-(4-phenoxyphenoxy)benzoate is synthesized as follows. A mixture of 15.00 g (80.6 mmoles) of 4-phenoxyphenol, 130 ml of N,N-dimethylformamide and 75 ml of toluene is agitated under nitrogen atmosphere. Potassium t-butoxide (9.32 g, 80.6 mmoles) is added with vigorous stirring and the mixture is heated to reflux. An azeotrope of t-butanol and toluene (85 ml) is collected at temperatures of 120° C. to 135° C. and is discarded. The mixture is cooled to ambient temperature, and a solution of 14.59 g (80.6 mmoles) of methyl 4-nitrobenzoate in 30 ml of N,N-dimethylformamide is added over a period of 15 minutes with cooling in a water bath. The mixture is heated at 100° C. for 14 hours, cooled to 20° C., and quenched with 1500 ml of ice water. The precipitate is filtered, dried in air and dissolved in 500 ml of acetone. The solution is filtered to remove insolubles, and the filtrate is concentrated by evaporation and cooled to precipitate methyl 4-(4-phenoxyphenoxy)benzoate. The recovered product weighs 21.23 g (82 percent yield) and has a melting point of 114° C. as determined by DSC.

Example B

Synthesis of 1-(4-Carboxylic Acid-phenoxy)-4-(4-sulfonic acid-phenoxy)benzene and acid chlorides thereof: AE-monomer or EE-monomer A solution of 9.00 g (28.1 mmoles) of methyl 4-(4-phenoxyphenoxy)benzoate in 150 ml of methylene chloride is cooled to 0° C. under nitrogen atmosphere with stirring. A solution of 1.87 ml (3.27 g, 28.1 mmoles) of chlorosulfonic acid in 50 ml of methylene chloride is added over a period of 15 minutes. The cooling bath is removed and the mixture is stirred for 14 hours. The precipitate is filtered, washed with 100 ml of methylene chloride and dried in air. It is mixed in slurry with 120 ml of methanol, 60 ml of water and 10.00 g of potassium hydroxide, and the slurry is refluxed for two hours. The cooled solution is acidified with hydrochloric acid, filtered, washed with 100 ml of cold water and dried in air. The product is recrystallized from 600 ml of a 5–1 by volume methanol and water solution and dried at 100° C. under vacuum to yield 10.84 g (91 percent yield) of 1-(4-carboxylic acid-phenoxy)-4-(4-sulfonic acid-phenoxy)benzene. The acid chloride is prepared by refluxing with thionyl chloride.

Example C

Synthesis of 4-(4-Phenoxyphenoxy)benzoic Acid and the Chloride Thereof: EN- or AN-monomer A slurry of 5.00 g (15.6 mmoles) of methyl 4-(4-phenoxyphenoxy)benzoate from Example A, 0.28 g (50.0 mmoles) of potassium hydroxide, 50 ml of methanol and 50 ml of deionized water is refluxed for 48 hours. Methanol is added until the mixture is homogeneous. Aqueous hydrochloric acid is added until the solution is strongly acidified, and the slurry is cooled. The resulting precipitate is filtered, washed with 300 ml of deionized water and dried in air. It is recrystallized from a minimum volume of hot 2–1 by volume methanol and water solution to yield 4.40 g (92 percent yield) of 4-(4-phenoxyphenoxy)benzoic acid having a melting point of 185° C. as measured by DSC.

A slurry of 2.30 g (7.52 mmoles) of 4-(4-phenoxyphenyoxy)benzoic acid, 30 ml of thionyl chloride and 2 drops of N,N-dimethylformamide is refluxed under nitrogen atmosphere for 16 hours. Excess thionyl chloride is distilled off to yield an oil, and 200 ml of anhydrous n-hexane is added. The solution is cooled to −15° C., and the resulting precipitate is filtered and dried under nitrogen atmosphere. The precipitate is dissolved in a minimum volume of hot n-hexane, the solution is filtered, and the filtrate is cooled to −15° C. to yield 1.82 g (66 percent yield of 4-(4-phenoxyphenoxy)benzoyl chloride having a melting point of 85° C. to 89° C. by DSC measurement.

Example D

Synthesis of 1,4-Bis(4-sulfonic Acid-phenoxy)Benzene and the Dichloride Thereof: EE-monomer A mixture of 10.00 g (38.2 mmoles) of 1,4-diphenoxybenzene in 300 ml of methylene chloride is agitated under nitrogen atmosphere. A solution of 5.08 ml (8.90 g, 76.4 mmoles) of chlorosulfonic acid in 30 ml of methylene chloride is added over 30 minutes, and the mixture is stirred for 16 hours. The precipitated product is filtered, rinsed with 100 ml of methylene chloride, dried in air, recrystallized from hot water and dried at 100° C. under vacuum to yield 13.21 g (82 percent yield) of 1,4-bis(phenoxy-4-sulfonic acid)benzene.

A mixture of 5.00 g (11.8 mmoles) of 1,4-bis(phenoxy-4-sulfonic acid)benzene, 75 ml of thionyl chloride and 3 drops of N,N-dimethylformamide is refluxed for 16 hours under nitrogen atmosphere. The resulting mixture is cooled to 20° C., and 300 ml of n-hexane is added to precipitate the product. The precipitate is filtered, rinsed with n-hexane and dried under nitrogen atmosphere. The precipitate is stirred with 50 ml of methylene chloride, and the resulting slurry is filtered. The filtrate is diluted with 500 ml of n-hexane, sealed under nitrogen atmosphere and cooled to −15° C. The precipitate is dried under nitrogen atmosphere and yields 4.11 g of 1,4-bis(phenoxy-4-sulfonyl chloride)benzene having a melting point of 198° C. as measured by DSC.

Example E

Synthesis of 4-(4-Sulfonic Acid-phenoxy)benzene Sulfonic acid and the Dichloride Thereof: EE-monomer A mixture of 10.00 g (58.8 mmoles) of diphenyl ether and 300 ml of methylene chloride is stirred under nitrogen atmosphere. A solution of 7.82 ml (13.71 g, 118 mmoles) of chlorosulfonic acid in 30 ml of methylene chloride is added over a period of 20 minutes, and the mixture is stirred for 16 hours. The resulting precipitate is filtered, rinsed with 100 ml of methylene chloride, recrystallized from hot water and dried at 100° C. under vacuum to yield 15.14 g (78 percent yield) of 4-(phenoxy-4-sulfonic acid)benzene sulfonic acid.

A mixture of 5.00 g (15.2 mmoles) of 4-(phenoxy-4-sulfonic acid)benzene sulfonic acid, 75 ml of thionyl chloride and 3 drops of N,N-dimethylformamide is refluxed for 16 hours under nitrogen atmosphere. The resulting mixture is cooled to 20° C. and 400 ml of n-hexane is added to precipitate the product. The precipitate is filtered, rinsed with 100 ml of n-hexane and dried under nitrogen atmosphere. The precipitate is stirred with 50 ml of methylene chloride, and the resulting slurry is filtered. The filtrate is diluted with 600 ml of n-hexane, sealed under nitrogen atmosphere and cooled to −15° C. The precipitate is dried under nitrogen atmosphere and yields 3.74 g (67 percent yield) of 4-(phenoxy-4-sulfonyl chloride)benzene sulfonyl chloride having a melting point of 128° C. by DSC.

SYNTHESIS OF INTERMEDIATE MONOMERS AND POLYMER:

Example 1

Synthesis of Poly(arylethersulfone)-Poly(cis-benzobisoxazole) (PES-PBO) Copolymer Using NN-monomer and Intermediate Monomer of BB- and AE-monomer A mixture containing 0.41 g (1.94 mmoles) of 4,6-diaminoresorcinol dihydrochloride and 1.50 g (3.88 mmoles) of 1-(4-carboxylic acid-phenoxy)-4-(4-sulfonic acid-phenoxy)benzene is stirred under nitrogen atmosphere. A 44.28-g solution containing 10 parts by weight methanesulfonic acid and 1 part by weight phosphorous pentoxide (hereinafter referred to as a 10-1 methanesulfonic acid solution) is added and the mixture is maintained at 70° C. for 2 hours. The temperature is raised to 90° C. for 16 hours. The mixture is cooled to 50° C. and 0.51 g (1.94 mmoles) of 1,4-diphenoxybenzene is added followed by 22.47 g of 10-1 methanesulfonic acid solution. The mixture is stirred at 50° C. for 72 hours. The title copolymer is precipitated by quenching the resulting dope in 500 ml of deionized water with vigorous stirring. The copolymer is rinsed with five 100-ml portions of deionized water, dried under vacuum at 100° C., subjected to soxhlet extraction with ethanol, and dried in vacuum at 100° C. It has a glass transition temperature of 209° C. as determined by DSC analysis and an inherent viscosity of 0.25 dL/g in concentrated sulfuric acid at 25° C. and a concentration of 0.5 g/dL.

Example 2

Synthesis of PES-PBO Copolymer Using NN-monomer and Intermediate Monomer From AE- and BB-monomer A mixture of 0.41 g (1.94 mmoles) of 4,6-diaminoresorcinol dihydrochloride and 1.64 g (3.88 mmoles) of 1-(4-chlorocarbonylphenoxy)-4-(4-chlorosulfonylphenoxy)benzene from Example B is stirred under nitrogen atmosphere. A 36.73-g solution of 10-1 methanesulfonic acid solution is added and the mixture is warmed to 70° C. for 2 hours. The temperature is raised to 90° C. for 16 hours. The solution is cooled to 50° C. and 0.51 g (1.94 mmoles) of 1,4-diphenoxybenzene is added with 29.94 g of 10-1 methanesulfonic acid solution. Stirring is continued at 50° C. for 72 hours. The resulting dope is quenched in 500 ml of deionized water. The title copolymer precipitates and is purified as described in Example 1. The resulting copolymer has a glass transition temperature of 222° C. by DSC analysis and an inherent viscosity of 0.36 dL/g in concentrated sulfuric acid at 25° C. and a concentration of 0.5 g/dL.

Example 3

Synthesis of PES-PBO Copolymer Using NN-monomer and Intermediate From AE- and BB-monomer The procedure of Example 2 is repeated except that 61.16 g of 10-1 methanesulfonic acid solution is added at the beginning, 0.33 g (1.94 mmoles, 0.31 ml) of diphenyl ether is substituted for the 1,4-diphenoxybenzene, and no 10-1 methanesulfonic acid solution is added after the NN-monomer. The resulting copolymer is purified as described in Example 1. It has a glass transition temperature of 236° C. as measured by DSC analysis and has an inherent viscosity of 0.25 dL/g in concentrated sulfuric acid at 25° C. and a concentration of 0.5 g/dL.

Example 4

Synthesis of PES-PBO Copolymer Using EE-Monomer and Intermediate Monomer From AN- and BB-monomer A mixture containing 0.21 g (0.97 mmole) of 4,6-diaminoresorcinol dihydrochloride and 0.72 g (1.94 mmoles) of 4-(4-phenoxyphenoxy)benzoyl chloride is stirred under nitrogen atmosphere. A 24.25-g quantity of 10–1 methanesulfonic acid solution is added and the mixture is warmed to 70° C. for 2 hours. The temperature is raised to 90° C. for 16 hours. A 0.45-g (0.97-mmole) quantity of 1,4-bis(4-chlorosulfonylphenoxy)-benzene is added, followed by 8.05 g of 10–1 methanesulfonic acid solution. The mixture is stirred at 90° C. for 72 hours and then quenched in 500 ml of deionized water. The resulting precipitate is purified as described in Example 1. The title copolymer has a glass transition temperature of 160° C. as measured by DSC analysis and an inherent viscosity of 0.16 dL/g in concentrated sulfuric acid at 25° C. and 0.5 g/dL concentration.

Example 5

Synthesis of Poly(aryletherketone)-Poly(cis-benzobisoxazole) (PEK-PBO) Copolymer Using NN-monomer and Intermediate EE-monomer from AE- and BB-monomer Under nitrogen atmosphere, the amounts of 4,6-diaminoresorcinol dihydrochloride (DAR) and oxy-bis(benzoic acid) (OBBA) shown in Table I below are mixed. A 10–1 methanesulfonic acid solution having the quantities shown in Table I below is added and the mixture is heated with stirring to 95° C. for about 24 hours. The solution is cooled to 50° C. and the amount of p-diphenoxybenzene (DPB) shown in Table I is added. The mixture is stirred for about 48 hours at 50° C. The title copolymer is precipitated in 2 N aqueous sodium hydroxide in a blender, washed with water and dried in a vacuum oven. It is dissolved in methanesulfonic acid at a concentration of about 0.05 dL/g and its inherent viscosity is measured at 25° C. The inherent viscosity is reported in Table I.

TABLE I

| | DAR (g) | DAR (mmole) | OBBA (g) | OBBA (mmole) | 10-1 MSA (ml) | DPB (g) | IV (dL/g) |
|---|---|---|---|---|---|---|---|
| 1 | 0.83 | 3.87 | 2.00 | 7.75 | 40 | 1.02 | 3.41 |
| 2 | 0.83 | 3.87 | 2.00 | 7.75 | 40 | 1.02 | 6.76 |
| 3 | 7.30 | 34.26 | 17.69 | 68.51 | 352 | 8.99 | 5.00 |

Example 6

Effect of Reaction Time on Inherent Viscosity of PEK-PBO Copolymer

The process of Example 5 (1) is repeated, except that aliquots of dope are taken and inherent viscosity is measured at several different times over the next 10 days. Viscosity in concentrated sulfuric acid at 25° C. and about 0.5 g/dL concentration is 0.87 dL/g at 23 hours, 1.02 dL/g at 47 hours, 1.06 dL/g at 71 hours, 1.11 dL/g at 98 hours, 1.00 dL/g at 146 hours, 0.99 dL/g at 168 hours, and 1.23 dL/g at 242 hours.

Example 7

Synthesis of PEK-PBO Using Intermediate EE-Monomer Made With Oxy-bis(4-Benzoyl Chloride)

Under nitrogen atmosphere, 4.43 g (15 mmoles) of oxy-bis(4-benzoyl chloride) and 1.60 g (7.50 mmoles) of 4,6-diaminoresorcinol dihydrochloride are stirred with 77.1 ml of 10–1 methanesulfonic acid solution. The reagents are stirred for 16 hours at room temperature and 24 hours at 95° C. The temperature is reduced to 50° C. and 1.97 g (7.50 mmoles) of p-diphenoxybenzene is added. The reaction is continued for 48 hours at 50° C. and the product is precipitated in aqueous potassium hydroxide in a blender. The resulting copolymer is slurried in aqueous potassium hydroxide, filtered, and washed with water until neutral. It is dried at 80° C. in a vacuum oven to constant weight. Its viscosity is measured in concentrated sulfuric acid at 25° C. and about 0.5 g/dL concentration at 1.12 dL/g.

Example 8

Synthesis of PEK-PBO Using Intermediate EE-Monomer in Polyphosphoric Acid Solution The process of Example 7 is repeated, except that in place of the methanesulfonic acid, 63.6 g of polyphosphoric acid having a 75.7 percent $P_2O_5$ content is used. The mixture is heated for 16 hours at 45° C. and then the temperature is raised to 95° C. After foaming stops, two 10.5-g quantities of phosphorous pentoxide are added and heating is continued at 95° C. for 24 hours. After diphenoxybenzene is added, the mixture is heated for 24 hours at 50° C. and 72 hours at 95° C. The copolymer is recovered and its inherent viscosity is measured as described in Example 7. It has an inherent viscosity of 1.39 dL/g.

Example 9

Synthesis of PEK-PBO Using Intermediate EE-Monomer Containing on Average More Than One Benzoxazole Unit Per EE-Monomer Under nitrogen atmosphere, 1.00 g (4.69 mmoles) of 4,6-diaminoresorcinol dihydrochloride and 1.62 g (6.26 mmoles) of oxy-bis(4-benzoic acid) are mixed and 29.1 ml of 10–1 methanesulfonic acid solution is added. The mixture is stirred and heated to 95° C. for 24 hours and then cooled to 50° C. A 0.41-g (1.56-mmole) quantity of p-diphenoxybenzene is added and stirring is continued at 50° C. for 48 hours. The resulting copolymer is precipitated in aqueous potassium hydroxide in a blender, washed with water until neutral and dried to constant weight in a vacuum oven at about 50° C. Its inherent viscosity in concentrated sulfuric acid at 25° C. and about 0.2028 g/dL concentration is measured to be about 0.99 dL/g. Its inherent viscosity in methanesulfonic acid at about 0.05 g/dL concentration and about 25° C. is measured to be 4.42 dL/g.

Example 10

Synthesis of PEK-PBO Using Intermediate EE-Monomer Containing on Average More Than One Benzoxazole Unit Per EE-Monomer A mixture of 1.60 g (7.51 mmoles) of 4,6-diaminoresorcinol dihydrochloride and 3.32 g (11.26 mmoles) of oxy-bis(4-benzoyl chloride) is stirred under nitrogen atmosphere. A 10–1 methanesulfonic acid solution (89.7 g) is added. The mixture is heated for 2 hours at 70° C. and for 24 hours at 90° C. It is cooled to 50° C. and 0.98 g (3.75 mmoles) of p-diphenoxybenzene is added and washed down with 9.0 g of 10–1 methanesulfonic acid solution. Mixing is continued at 50° C. for 48 hours. The resulting copolymer is precipitated in a blender with aqueous sodium hydroxide, washed with water and dried to a constant weight. Its viscosity in concentrated sulfuric acid at 25° C. and a concentration of about 0.5 g/dL is about 0.96 dL/g.

Example 11

Synthesis of PEK-PBO Using Intermediate EE-Monomer Made Using Bis(4-Benzoic Acid) as AE-monomer A mixture of 1.50 g (7.04 mmoles) of 4,6-diaminoresorcinol dihydrochloride and 2.27 g (9.39 mmoles) of bis(4-benzoic acid) is stirred under nitrogen atmosphere and warmed. A 41.7 ml quality of 10–1 methanesulfonic acid solution is added and stirring is continued for 16 hours at 95° C. Undissolved solids are observed. The mixture is stirred at 120° C. for about 8 hours and overnight at 150° C. High viscosity is observed. The mixture is cooled to 50° C. and 0.61 g (2.33 mmoles) of p-diphenoxybenzene is added. Reaction is continued at 50° C. for 48 hours and the product is isolated as described in Example 10. It has an inherent viscosity in methanesulfonic acid at 25° C. and about 0.05 g/dL of 6.75 dL/g.

Example 12

Preparation of EE-Monomer and Resulting copolymer Using BE-and AE-monomers

A mixture of 1.21 g (5.82 mmoles) of 3-amino-4-hydroxybenzoic acid hydrochloride monohydrate, 1.53 g (5.82 mmoles) of diphenoxybenzene, 1.72 g (5.82 mmoles) of oxy-bis(4-benzoyl chloride) and 58.2 g of polyphosphoric acid (about 76 percent $P_2O_5$) is mixed under nitrogen atmosphere with stirring. The mixture is heated for 16 hours at 45° C., a 25.5 g quantity of $P_2O_5$ is added and the mixture is heated for 72 hours at 95° C. The resulting copolymer is coagulated in water as previously described and its inherent viscosity in methanesulfonic acid at 25° C. and 0.4662 g/dL concentration is measured at 0.15 dL/g.

Example 13

Synthesis of PEK-PBO By One Step Reaction of AN- and BE-monomers

A mixture of (1.00 g, 4.67 mmoles) of 4-phenoxybenzoic acid and 0.96 g (4.67 mmoles) of 3-amino-4-hydroxybenzoic acid hydrochloride containing 8.56 weight percent water and 26.4 g of polyphosphoric acid (76.7 weight percent $P_2O_5$) is stirred under nitrogen atmosphere. The mixture is heated at 50° C. for 16 hours and the temperature is raised to 85° C. Phosphorous pentoxide (13.8 g) is added and the reaction is continued for 8 hours at 85° C. and for 40 hours at 110° C. The resulting copolymer is coagulated in water and washed with 5 percent aqueous sodium bicarbonate and with water. Its inherent viscosity in concentrated sulfuric acid at 0.208 g/dL concentration at 25° C. is 0.18 dL/g.

Example 14

Preparation of Intermediate EE-monomer and PEK-PBO Copolymer Using Bis(4-benzoic Acid)

A mixture of 0.83 g (3.9 mmoles) of 4,6-diaminoresorcinol dihydrochloride and 1.89 g (7.79 mmoles) of bis(4-benzoic acid) is mechanically stirred under nitrogen atmosphere in 40 ml of 10–1 methanesulfonic acid solution. The mixture is warmed at 95° C. for 16 hours and at 145° C. for 24 hours. The temperature is decreased to 50° C. and 1.02 g (3.9 mmoles) of p-diphenoxybenzene is added. The reaction is continued at 50° C. for 48 hours. The product is precipitated using aqueous potassium hydroxide. It has an inherent viscosity of 2.44 dL/g in methanesulfonic acid at 25° C. and a concentration of about 0.2 g/dL.

Example 15

Synthesis of PEK-PBO Copolymer Using m-Diphenoxybenzene

A mixture of 1.00 g (4.69 mmoles) of 4,6-diaminoresorcinol dihydrochloride, 2.77 g (9.39 mmoles) of oxy-bis(4-benzoyl chloride), 1.23 g (4.69 mmoles) of m-diphenoxybenzene and 40.3 g of polyphosphoric acid (76.0 weight percent $P_2O_5$) is mechanically stirred under nitrogen atmosphere. The mixture is heated at 45° C. for 16 hours. The temperature is raised to 95° C. and two 9.6 g quantities of phosphorous pentoxide are added. The reaction is continued at 95° C. for 72 hours and the resulting product is coagulated in a blender with aqueous sodium hydroxide. The product has an inherent viscosity in concentrated sulfuric acid of 0.182 dL/g at 25° C. and a concentration of 0.5044 g/dL.

Example 16

Preparation of PEK-PBO Copolymer Using Isophthalic Acid and Intermediate AA-monomer A mixture of 1.23 g (4.69 mmoles) of p-diphenoxybenene, 1.56 g (9.39 mmoles) of isophthalic acid and 54.8 g of 10–1 methanesulfonic acid solution are mixed under nitrogen atmosphere for 16 hours at 60° C. The temperature is raised to 95° C. and 1.00 g of 4,6-diaminoresorcinol dihydrochloride is added and washed down with 25.4 g of 10–1 methanesulfonic acid solution. The reaction is continued for 72 hours at 95° C. The product is precipitated in a blender with aqueous sodium hydroxide, washed and filtered repeatedly with water, and dried to constant weight at 100° C. in a vacuum oven. It has an inherent viscosity of 0.187 dL/g in concentrated sulfuric acid at 25° C. and a concentration of 0.4632 g/dL.

Example 17

Synthesis of PEK-PBO Monomer and Copolymer Wherein Benzazole Moiety Contains Sulfone Linkages Using One-Step Reaction of BB-, AE and NN-monomers A mixture of 2.50 g (6.73 mmoles) of 3,3'-diamino-4,4'-dihydroxydiphenyl sulfone dihydrochloride monohydrate, 3.97 g (13.5 mmoles) of oxy-bis(4-benzoyl chloride), 1.77 g (6.73 mmoles) of p-diphenoxybenzene and 67.4 g of polyphosphoric acid (76.0 weight percent $P_2O_5$) is mechanically stirred under nitrogen atmosphere. The mixture is heated for 16 hours at 45° C. The temperature is raised to 95° C., two 16.3-g quantities of phosphorous pentoxide are added, and the reaction is continued at 95° C. for 48 hours. The product is coagulated in aqueous sodium hydroxide, washed with water, dried in a vacuum oven, ground to a No. 10 mesh, re-soaked with water, and dried to a constant weight under vacuum at 100° C. The copolymer has an inherent viscosity of 0.82 dL/g in concentrated sulfuric acid at 25° C. and a concentration of 0.4952 g/dL.

Example 18

Preparation of PEK-PBT Using One-Step Reaction of BB-, AE- and NN-monomers

A mixture of 1.15 g (4.70 mmoles) of 2,5-diamino-1,4-dithiobenzene dihydrochloride, 2.77 g (9.40 mmoles) of oxy-bis(4-benzoyl chloride), 1.23 g (4.70 mmoles) of p-diphenoxybenzene and 42.0 g of polyphosphoric acid is stirred under nitrogen atmosphere. The temperature is raised to 45° C. for 16 hours. The temperature is raised to 95° C., 19.9 g of phosphorous pentoxide is added, and the reaction is continued at 95° C. for 48 hours. The resulting copolymer is coagulated in aqueous potassium hydroxide, cut up and soaked in water until neutral. It is ground to a No. 10 mesh, soaked in water overnight and dried to a constant weight at 80° C. under vacuum. The copolymer has an inherent viscosity of 1.64 dL/g in concentrated sulfuric acid at 25° C. and 0.4928 g/dL.

Example 19

Preparation of PEK-PBO Containing AB- and AA/BB-Benzoxazole Units in Benzoxazole Moiety A mixture of 1.00 g (4.69 mmoles) of 4,6-diaminoresorcinol dihydrochloride, 1.95 g (9.40 mmoles) of 3-amino-4-hydroxybenzoic acid hydrochloride and 104 g of 10-1 methanesulfonic acid solution is stirred under nitrogen atmosphere for 24 hours at 90° C. The temperature of the mixture is cooled to 70° C. and 2.77 g (9.40 mmoles) of oxy-bis(4-benzoyl chloride) is added followed by about 7 g of 10-1 methanesulfonic acid solution. The temperature is raised to 90° C. for an additional 24 hours and then lowered to 50° C. p-Diphenoxybenzene (1.23 g, 4.69 mmoles) is added and the reaction is continued for 48 hours at 50° C. The copolymer is precipitated in aqueous sodium hydroxide, washed with water until neutral and dried to constant weight in a vacuum oven. It has an inherent viscosity of 0.56 dL/g in concentrated sulfuric acid at a concentration of 0.456 g/dL.

Example 20

Preparation of PEK-PBO Using 4-Phenoxybiphenyl as NN-monomer

A mixture of 1.50 g (7.04 mmoles) of 4,6-diaminoresorcinol dihydrochloride, 4.15 g (14.08 mmoles) of oxy-bis(4-benzoyl chloride) and 79 ml of 10-1 methanesulfonic acid solution is stirred under nitrogen atmosphere for 16 hours at 70° C. and for 24 hours at 90° C. The temperature is reduced to 50° C., 1.85 g (7.04 mmoles) of 4-phenoxybiphenyl is added, and the reaction is continued for 24 hours at 50° C. and for 24 hours at 70° C. The product is precipitated in the aqueous potassium hydroxide in a blender, washed with water and collected by filtration. It has an inherent viscosity of 0.15 dL/g in concentrated sulfuric acid at a concentration of 0.5004 g/dL.

Example 21

Synthesis of PEK-PBO Using Intermediate NN-Monomer

A mixture of 0.23 g (1.06 mmoles) of 4,6-diaminoresorcinol dihydrochloride and 0.65 g (2.12 mmoles) of 4-(4-phenoxyphenoxy)benzoic acid is stirred under nitrogen atmosphere. A 30.0-g quantity of 10-1 methanesulfonic acid solution is added and the mixture is heated at 95° C. for 16 hours. The temperature of the mixture is lowered to 50° C. and 0.31 g (1.06 mmoles) of oxy-bis(4-benzoyl chloride) is added and washed down with 17.0 g of 10-1 methanesulfonic acid solution. The reaction is continued at 50° C. for 48 hours. The resulting copolymer is precipitated in an aqueous basic solution, washed three times with water and filtered. It has an inherent viscosity in concentrated sulfuric acid of 0.222 dL/g at a concentration of 0.5016 g/dL.

Example 22

Synthesis of PEK-PBO Using One-Step Reaction of BB-, NN- and AE-monomers

The procedure of Example 21 is repeated except 67.3 g of polyphosphoric acid (about 76 percent $P_2O_5$ by weight) is substituted for the 10-1 methanesulfonic acid solution, and the oxy-bis(4-benzoyl chloride) is added at the beginning. The mixture is stirred for 16 hours at 45° C. The temperature is raised to 95° C., 27.7 g of phosphorous pentoxide is added, and the reaction is continued for 96 hours at 95° C. The copolymer has an inherent viscosity of 0.43 dL/g in concentrated sulfuric acid at a concentration of 0.4836 g/dL.

Example 23

Synthesis of PEK-PBO Polyamide Copolymer

A diamide is prepared by the following reaction. A 1.08 g (9.29 mmol) quantity of hexamethylene diamine is dissolved in about 100 ml of N,N-dimethylacetamide with mechanical stirring under nitrogen atmosphere. A 6.00 g (18.5 mmol) quantity of phenoxyphenoxybenzoyl chloride prepared as described in Example C is added with 20 ml of N,N-dimethylacetamide and 2.2 ml of pyridine. The mixture is stirred at room temperature for 20 hours. NN-monomer containing amide linkages is collected, washed in dilute aqueous hydrochloric acid, aqueous sodium bicarbonate and water. The product is recrystallized from a mixture of N,N-dimethylformamide and methanol, and is dried.

A mixture of 0.69 g (3.22 mmoles) of 4,6-diaminoresorcinol dihydrochloride and 1.90 g (6.44 mmoles) of oxy-bis(4-benzoyl chloride) is stirred under nitrogen atmosphere. A 10-1 methanesulfonic acid solution (96 g) is added and the temperature is raised to 70° C. for 2 hours and to 90° C. for about 22 hours. The temperature is lowered to 50° C. and 2.23 g (3.22 mmoles) of the diether amide is added followed by 42.4 g of 10-1 methanesulfonic acid solution. The reaction is continued at 50°. C. for 72 hours. The resulting copolymer is precipitated in a blender in a phosphate-buffered aqueous sodium hydroxide solution. It is washed with water several times and dried to constant weight in a vacuum oven at about 50° C. The resulting copolymer has an inherent viscosity of 0.81 dL/g at a concentration of 0.4383 g/dL.

Example 24

Synthesis of PEK-PBO Polyamide Copolymer

A 1.55 g (7.72 mmol) quantity of diaminododecane is dissolved in about 100 ml of N,N-dimethylacetamide with mechanical stirring under nitrogen atmosphere. A 5.01 g (15.4 mmol) quantity of phenoxyphenoxybenzoyl chloride prepared as described in Example C is added with 20 ml of N,N-dimethylacetamide and 2.2 ml of pyridine. The mixture is stirred at room temperature for 16 hours. NN-monomer containing amide linkages is collected, washed in dilute aqueous hydrochloric acid, aqueous sodium bicarbonate and water. The product is recrystallized from N,N-dimethylformamide, and is dried.

The procedure of Example 23 is repeated using 0.60 g (2.83 mmoles) of 4,6-diaminoresoreinol dihydrochloride, 1.67 g (5.66 mmoles) of oxy-bis(4-benzoyl chloride), 77.2 g of 10-1 methanesulfonic acid solution initially, 2.20 g (2.83 mmoles) of the NN-monomer synthesized above and 12.8 g of 10-1 methanesulfonic acid solution to wash the diether amide down. The resulting copolymer has an inherent viscosity in concentrated sulfuric acid at a concentration of 0.4124 g/dL of 0.99 dL/g.

Example 25

Synthesis of PEK-PBO Copolymer by One-Step Reaction of BB-, AE- and AN-monomers

Under nitrogen atmosphere, 2.00 g (9.39 mmol) of 4,6-diaminoresorcinol dihydrochloride, 1.91 g (9.39 mmol) of terephthaloyl chloride, 2.01 g (9.39 mmol) of p-phenoxybenzoic acid and 51.3 g of polyphosphoric acid containing about 76.3 percent $P_2O_5$ are mixed. The reagents are heated with stirring for 20 hours at 45° C. and then the temperature is raised to 95° C. Two 12.5 g quantities of phosphorus pentoxide are added, and heating is continued with stirring for 8 hours at 95° C., 16 hours at 110° C. and 24 hours at 150° C. The title copolymer is recovered and has an inherent viscosity of 0.55 dL/g in methanesulfonio acid at 25° C. and a concentration of 0.1928 g/dL. It is theorized that the molecular weight of the copolymer is reduced due to the high temperature of the reaction, the inadequate decoupling in the AE- and AN-monomers, or both.

Example 26

Synthesis of PEK-PBO Copolymer by One-Step Reaction of BB-, and AE- and NN-monomers A mixture of 1.00 g (4.69 mmol) of 4,6-diaminoresorcinol dihydrochloride, 2.77 g (9.39 mmol) of oxy-bis-(4-benzoyl chloride), 1.28 g (4.69 mmol) of p-diphenoxybenzene and 40.7 g of polyphosphoric acid containing about 76 percent $P_2O_5$ is agitated under nitrogen atmosphere. The mixture is heated at 45° C. for 16 hours. The temperature is raised to 95° C., 18.8 g of phosphorus pentoxide is added, and the reaction is continued for 72 hours at 95° C. The title copolymer is recovered and has inherent viscosity of 1.37 dL/g in concentrated sulfuric acid at 25° C. and a concentration of 0.4944 g/dL.

Example 27

Synthesis of Poly(benzimiazole)/poly(aryl ether ketone) (PEK-PBI) Copolymer Using BB-monomer and Intermediate AA-monomer From AE- and NN-monomers A mixture of 96.9 g 10-1 methanesulfonic acid solution, 1.84 g (7.00 mmol) of p-diphenoxybenzene and 4.13 g (14.00 mmol) of oxy-bis(4-benzoylchloride) is agitated under nitrogen atmosphere at 50° C. for 48 hours. A 1.50 g (7.00 mmol) quantity of 3,3'-diaminobenzidine is added, and agitation is continued for 48 hours at 50° C. and 24 hours at 90° C. The title copolymer is recovered, and has an inherent viscosity of 0.87 dL/g in concentrated sulfuric acid at 25.0° C. and a concentration of 0.5132 g/dL. DSC analysis of the oopolymer indicates a glass transition temperature at 223° C.

What is claimed is:

1. A process for synthesizing a copolymer having benzazole moieties and aromatic ketone or sulfone moieties, said process comprising the step of contacting a plurality of difunctional primary monomers in a non-oxidizing, dehydrating solvent acid under conditions such that functional moieties of the monomers react simultaneously or sequentially to form azole rings and aromatic ketone or sulfone moieties which link the monomers, whereby a copolymer is formed, wherein each difunctional monomer contains at least two functional moieties chosen from the group consisting of azole-forming moieties and acylation reactive groups and chosen such that:
   (a) at least two monomers contain azole-forming moieties capable of reaction to form an azole ring,
   (b) at least two monomers contain acylation reactive groups capable of reacting together to form an aromatic ketone or sulfone moiety, and
   (c) at least one monomer contains a functional moiety capable of reacting as an acylation group and a functional moiety capable of reacting as an azole-forming moiety.

2. The process of claim 1 wherein said primary monomers are reacted simultaneously.

3. The process of claim 2 wherein the temperature of said reaction is between about 25° C. and 200° C.

4. The process of claim 1 wherein said primary monomers are reacted sequentially to first form intermediate monomers containing aromatic ketone or sulfone moieties, and to second form azole rings linking the intermediate monomers.

5. The process of claim 4 wherein the both reactions occur at between 0° C. and about 200° C.

6. The process of claim 1 wherein the primary monomers are reacted to first form intermediate monomers containing azole rings and to second form aromatic ketone or sulfone moieties linking the intermediate monomers.

7. The process of claim 6 wherein the first step takes place at 50° C. to 200° C. and the second step at 40° C. to 150° C.

8. The process of claim 1 wherein the primary monomers are chosen from the group consisting of:
   (a) AE-monomers that contain:
      1. an electron-deficient carbon group;
      2. a decoupling group linked to said electron-deficient carbon group; and
      3. an acid group bonded to said decoupling group in a position wherein it is capable of reacting with an aromatic group to form an aromatic ketone or sulfone moiety in solvent acid;
   (b) AN-monomers that contain:
      1. an electron-deficient carbon group;
      2. a decoupling group linked to said electron-deficient carbon group; and
      3. an aromatic group bonded to said decoupling group in a position where it is sufficiently active to react with an acid group in solvent acid;
   (c) BE-monomers that contain:
      1. a first aromatic group;
      2. an o-amino-basic group bonded to said aromatic group; and
      3. an acid group linked to said aromatic group such that it is capable of reacting with an aromatic group in solvent acid;

(d) BN-monomers that contain:
   1. a first aromatic group;
   2. an o-amino-basic moiety bonded to said aromatic group; and
   3. a second aromatic group linked to said first aromatic group by a bond or a decoupling moiety such that is it capable of reacting with an aromatic group in solvent acid:
(e) AA-monomers that contain two electron-deficient carbon groups linked by a divalent organic moiety which is inert under reaction conditions;
(f) BB-monomers that contain:
   1. an aromatic group
   2. a first o-amino-basic moiety bonded to said aromatic group; and
   3. a second o-amino-basic moiety bonded to said aromatic group;
(h) AB-monomers that contain:
   1. an aromatic group
   2. a first o-amino-basic moiety bonded to said aromatic group; and
   3. an electron-deficient carbon group linked to said aromatic group;
(i) EE-monomers that contain two acid groups linked by a decoupling group;
(j) NN-monomers that contain two aromatic groups linked by a decoupling group; and
(k) EN-monomers that contain an acid group and an aromatic group linked by a decoupling group.

9. The process of claim 8 wherein an AE-monomer is reacted with a BN-monomer.

10. The process of claim 8 wherein an AN-monomer is reacted with a BE-monomer.

11. The process of claim 8 wherein the primary monomers reacted comprise AN-, BN- and EE-monomers.

12. The process of claim 8 wherein the primary monomers reacted comprise AA-, BN- and EE-monomers.

13. The process of claim 8 wherein the primary monomers comprise AA-, BE- and NN-monomers.

14. The process of claim 8 wherein the primary monomers comprise AA-, BN- and BE-monomers.

15. The process of claim 8 wherein the primary monomers comprise AE-, AN- and BB-monomers.

16. The process of claim 15 wherein said AE-monomers comprise:
1) an electron-deficient carbon group:
2) a decoupling group bonded to said electron-deficient carbon group and containing two aromatic groups, and
3) an acid group bonded to said decoupling group,
and said AN-monomer comprise
1) an electron-deficient carbon group:
2) a decoupling group bonded to said electron-deficient carbon group and containing two aromatic groups and an oxygen atom: and
3) an aromatic group bonded to said decoupling group.

17. The process of claim 8 wherein the primary monomers comprise AN-, BB- and EE-monomers.

18. The process of claim 17 wherein the AN-monomer comprises:
1) an electron-deficient carbon group:
2) a decoupling group bonded to said said group and containing two aromatic groups and an oxygen atom; and
3) an aromatic group bonded to said decoupling group and the EE-monomer comprises:
1) a first acid group:
2) a decoupling group containing two aromatic groups and
3) a second acid group.

19. The process of claim 18 wherein the BB-monomer comprises two o-amino-basic moieties bonded to an aromatic group containing no more than 12 oar bon atoms.

20. The process of claim 19 wherein the AN-monomer is phenoxyphenoxybenzoic acid or its halide: the EE-monomer is oxy-bis-(4-benzoic acid), bis-(4-benzoic acid) or their halides, and the BB-monomer is a 4,6-diaminoresorcinol, 2,5-diaminohydroquinone, 2,5-diamino-1,4-dithiobenzene, and/or acid salts thereof.

21. The process of claim 19 where the AN- and BB-monomers are reacted first and then the EE-monomer is added.

22. The process of claim 8 wherein the primary monomers comprise AE-, BE- and NN-monomers.

23. The process of claim 22 wherein the AE-monomer comprises:
1) an electron-deficient carbon group:
2) a decoupling group bonded to said electron-deficient carbon group and containing two aromatic groups: and
3) an acid group bonded to said decoupling group,
and said NN-monomer comprises two aromatic groups linked by a decoupling group which contains an aromatic group and an ether oxygen.

24. The process of claim 23 wherein the BE-monomer comprises:
1) an aromatic group:
2) an o-amino-basic moiety bonded to said aromatic group; and
3) an acid group bonded to said aromatic group.

25. The process of claim 24 wherein the BE-monomer comprises:
1) an aromatic group:
2) an o-amino-basic moiety bonded to said aromatic group:
3) a decoupling group bonded to said aromatic group; and
4) an acid group bonded to said decoupling group.

26. The process of claim 8 wherein the primary monomers comprise AE-, BB- and NN-monomers.

27. The process of claim 26 which conforms generally to the formula:

$$X\,Q\text{—}D^1\text{—}AG + \begin{matrix} H_2N & NH_2 \\ \diagdown & \diagup \\ & Ar & \\ \diagup & \diagdown \\ HZ & ZH \end{matrix} + Ar\text{—}D^2\text{—}Ar \longrightarrow$$

$$\left\{ Y\text{—}D^1\text{—}\left( \begin{matrix} N & N \\ \diagdown & \diagup \\ & Ar^1 & \\ \diagup & \diagdown \\ Z & Z \end{matrix} \right)\text{—}D^1\text{—}\right\}_b Y\text{—}Ar\text{—}D^2\text{—}Ar \right\}_a$$

wherein:
X is a number of moles of AE-monomer greater than the number of moles of BB-monomer in the reaction mixture;
Q is an electron-deficient carbon group;
$D^1$ and $D^2$ are independently decoupling groups;
AG is an acid group;
each Ar is independently an aromatic group;

each Z is independently an oxygen atom, a sulfur atom, or a nitrogen atom which is also bonded to a hydrogen atom or an organic moiety which is inert with respect to all reagents under reaction conditions;

each Y is individually a carbonyl or a sulfonyl moiety;

a is a number of repeating units greater than 1; and b is a number of repeating units averaging greater than 0 and less than 10.

28. The process of claim 26 wherein the AE-monomer comprises:

1) an electron-deficient carbon group:
2) a decoupling group bonded to said electron-deficient carbon group and containing two aromatic groups: and
3) an acid group bonded to said decoupling group.

29. The process of claim 28 wherein said acid group in the AE-monomer is a sulfonic acid or derivative.

30. The process of claim 29 wherein the decoupling group in the AE-monomer comprises three aromatic groups linked by oxygen atoms.

31. The process of claim 29 wherein the BB-monomer contains two o-amino-basic moieties bonded to an aromatic group containing no more than about six carbon atoms.

32. The process of claim 31 wherein the NN-monomer comprises two aromatic groups linked by a decoupling group containing an aromatic group and at least one ether oxygen.

33. The process of claim 29 wherein the NN-monomer contains two aromatic groups linked by a decoupling group which contains at least one amide or imide moiety.

34. The process of claim 29 wherein the AE- and BB-monomers are reacted first, and the NN-monomer is added and reacted second.

35. The process of claim 28 wherein the acid group of the AE-monomer is a carboxylic acid group.

36. The process of claim 35 wherein the NN-monomer contains two aromatic groups linked by a decoupling group which contains at least one amide or imide moiety.

37. The process of claim 35 wherein the NN-monomer contains two aromatic groups linked by a decoupling group having an aromatic group and at least one ether oxygen atom.

38. The process of claim 37 wherein each aromatic group in the AE-, BB- and NN-monomers is hydrocarbyl and comprises no more than 12 carbon atoms.

39. The process of claim 38 wherein the reaction follows generally the formula:

X is a number of moles of AE-monomer which is at least 1.5 moles per mole of BB-monomer and at most 3 moles per mole of BB-monomer;

each Q is an electron-deficient carbon group:

each Ar is independently an aromatic group:

each J is independently an oxygen atom, a sulfur atom or a bond, chosen such that at least one J of the NN-monomer is oxygen:

each Z is independently an oxygen atom, a sulfur atom, or a nitrogen atom bonded to a hydrogen atom or an inert organic moiety;

a is a number of repeating units greater than 1; and b is a number of repeating units which averages greater than 0 and less than 10.

40. The process of claim 38 wherein the electron-deficient carbon group and the acid group of the AE-monomer are each a carboxylic acid or acid chloride.

41. The process of claim 40 wherein the AE-monomer is oxy-bis-(4-benzoic acid), bis-(4-benzoic acid) or the acid chloride of those acids.

42. The process of claim 41 wherein the BB-monomer is chosen from the group consisting of 4,6-diaminoresorcinol; 2,5-diamionhydroquinone: 2,5-diamino-1,4-dithiobenzene and acid salts thereof.

43. The process of claim 42 wherein the NN-monomer is diphenoxybenzene, phenoxybiphenyl or 4,4'-diphenoxybiphenyl.

44. The process of claim 43 wherein the AE- and BB-monomers are reacted together first, and the NN-monomer is added to and reacted with that reaction product.

45. The process of 38 wherein the solvent acid is polyphosphoric acid or a mixture of methanesulfonic acid and phosphorus pentoxide and/or polyphosphoric acid.

46. The process of claim 1 wherein the solvent acid comprises polyphosphoric acid, methanesulfonic acid and/or trifluoromethanesulfonic acid.

47. The process of claim 1 wherein the solvent acid is polyphosphoric acid.

48. The process of claim 1 wherein the solvent acid is a mixture containing methanesulfonic acid and polyphosphoric acid and/or phosphorus pentoxide.

49. A copolymer having a plurality of mer units which each independently comprise:

(1) a benzazole moiety;
(2) a decoupling group bonded to the 2-carbon of an azole ring in the benzazole moiety;
(3) an aromatic sulfone group bonded to the decoupling group consisting essentially of an aromatic group bonded to a sulfonyl group; and
(4) a bond or a decoupling group linking the aromatic

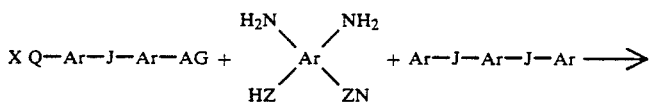

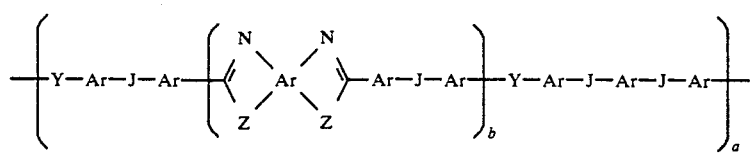

wherein sulfone group to the benzazole moiety of an adjacent mer unit.

50. The copolymer of claim 49 wherein a plurality of mer units are represented by the Formula:

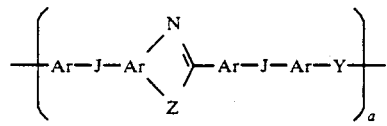

wherein
each Ar is independently an aromatic group:
each J is an oxygen atom, a sulfur atom or a bond;
each Z is independently an oxygen atom, a sulfur atom, or a nitrogen atom which is also bonded to a hydrogen atom or an organic moiety which is inert with respect to all reagents under reaction conditions;
each Y is a sulfonyl moiety;
a is a number of repeating units greater than 1; and
b is a number of repeating units averaging greater than 0 and less than 10.

51. The copolymer of claim 49 wherein a plurality of mer units are represented by the Formula:

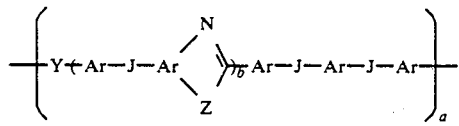

wherein:
each Ar is independently an aromatic group:
each J is an oxygen atom, a sulfur atom or a bond;
each Z is independently an oxygen atom, a sulfur atom, or a nitrogen atom which is also bonded to a hydrogen atom or an organic moiety which is inert with respect to all reagents under reaction conditions;
each Y is a sulfonyl moiety;
a is a number of repeating units greater than 1; and
b is a number of repeating units averaging greater than 0 and less than 10.

52. The copolymer of claim 49 wherein a plurality of mer units are represented by the Formula:

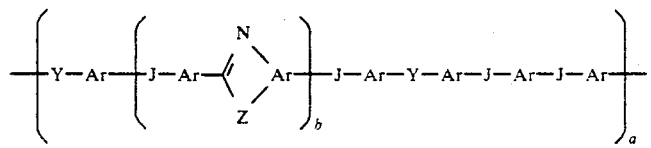

wherein:
each Ar is independently an aromatic group:
each J is an oxygen atom, a sulfur atom or a bond;
each Z is independently an oxygen atom, a sulfur atom, or a nitrogen atom which is also bonded to a hydrogen atom or an organic moiety which is inert with respect to all reagents under reaction conditions;
each Y is a sulfonyl moiety;
a is a number of repeating units greater than 1; and
b is a number of repeating units averaging greater than 0 and less than 10.

53. The copolymer of claim 49 wherein a plurality of mer units are represented by the Formula:

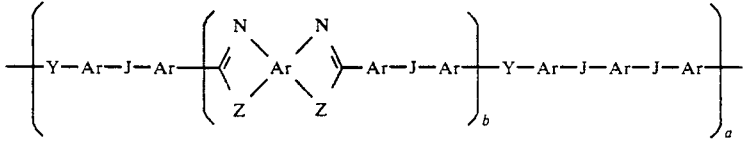

wherein:
each Ar is independently an aromatic group:
each J is an oxygen atom, a sulfur atom or a bond;
each Z is independently an oxygen atom, a sulfur atom, or a nitrogen atom which is also bonded to a hydrogen atom or an organic moiety which is inert with respect to all reagents under reaction conditions;
each Y is a sulfonyl moiety;
a is a number of repeating units greater than 1; and
b is a number of repeating units averaging greater than 0 and less than 10.

54. The copolymer of claim 49 wherein a plurality of mer units are represented by the Formula:

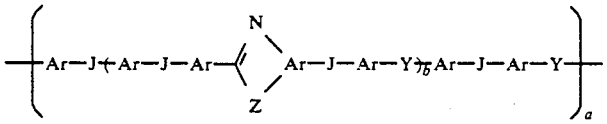

wherein:
each Ar is independently an aromatic group:
each J is an oxygen atom, a sulfur atom or a bond;
each Z is independently an oxygen atom, a sulfur atom, or a nitrogen atom which is also bonded to a hydrogen atom or an organic moiety which is inert with respect to all reagents under reaction conditions;
each Y is a sulfonyl moiety;
a is a number of repeating units greater than 1; and
b is a number of repeating units averaging greater than 0 and less than 10.

55. The copolymer of claim 49 wherein a plurality of mer units are represented by the Formula:

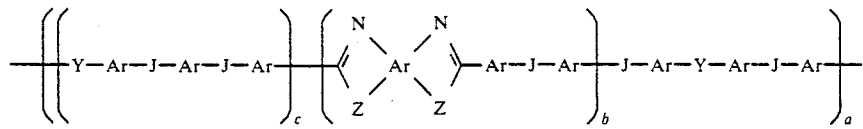

wherein:
  each Ar is independently an aromatic group:
  each J is an oxygen atom, a sulfur atom or a bond;
  each Z is independently an oxygen atom, a sulfur atom, or a nitrogen atom which is also bonded to a hydrogen atom or an organic moiety which is inert with respect to all reagents under reaction conditions;
  each Y is a sulfonyl moiety;
  a is a number of repeating units greater than 1; and
  b is a number of repeating units averaging greater than 0 and less than 10.

* * * * *

UNITED STATES PATENT AND TRADEMARK OFFICE
CERTIFICATE OF CORRECTION

Page 1 of 4

PATENT NO. : 5,110,894
DATED : May 5, 1992
INVENTOR(S) : William J. Harris

It is certified that error appears in the above-indentified patent and that said Letters Patent is hereby corrected as shown below:

On the Title page, item [56] col. 1, line 4, delete " 4,539,567 " and insert -- 4,359,567 --.

Column 43, line 47, delete " group: " and insert -- group; --.
Column 43, line 52, delete " comprise " and insert -- comprises: --.
Column 43, line 53, delete " group: " and insert -- group; --.
Column 43, line 56, delete " atom: " and insert -- atom; --.
Column 43, line 62, delete " group: " and insert -- group; --.
Column 43, line 68, delete " group: " and insert -- group; --.
Column 44, line 6, delete " oar bon " and insert -- carbon --.
Column 44, line 9, delete " halide: " and insert -- halide; --.
Column 44, line 21, delete " group: " and insert -- group; --.

UNITED STATES PATENT AND TRADEMARK OFFICE
CERTIFICATE OF CORRECTION

PATENT NO. : 5,110,894

DATED : May 5, 1992

INVENTOR(S) : William J. Harris, of Midland, Michigan.

It is certified that error appears in the above-identified patent and that said Letters Patent is hereby corrected as shown below:

Column 44, line 23, delete " groups: " and insert -- groups; --.

Column 44, line 31, delete " group: " and insert -- group; --.

Column 44, line 37, delete " group: " and insert -- group; --.

Column 44, line 39, delete " group: " and insert -- group; --.

Column 44, lines 53 through 59, delete

"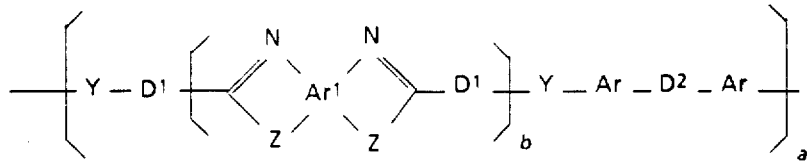"

and insert

--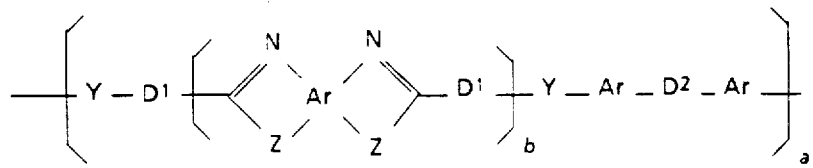--.

UNITED STATES PATENT AND TRADEMARK OFFICE
CERTIFICATE OF CORRECTION

PATENT NO. : 5,110,894

DATED : May 5, 1992

INVENTOR(S) : William J. Harris, of Midland, Michigan.

It is certified that error appears in the above-identified patent and that said Letters Patent is hereby corrected as shown below:

Column 45, line 13, delete " group: " and insert -- group; --.

Column 45, line 15, delete " groups: " and insert -- groups; --.

Column 45, lines 55 through 60, delete

"
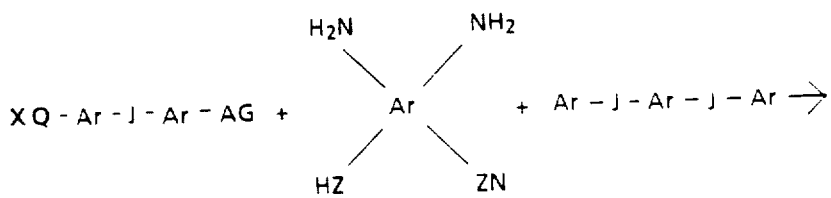
"

and insert

--
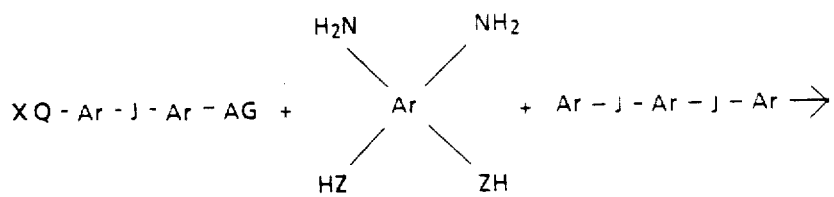
--.

UNITED STATES PATENT AND TRADEMARK OFFICE
CERTIFICATE OF CORRECTION

PATENT NO. : 5,110,894
DATED : May 5, 1992
INVENTOR(S) : William J. Harris, of Midland, Michigan.

It is certified that error appears in the above-identified patent and that said Letters Patent is hereby corrected as shown below:

Column 46, line 4, delete " group: " and insert -- group; --.
Column 46, line 5, delete " group: " and insert -- group; --.
Column 46, line 8, delete " oxygen: " and insert -- oxygen; --.
Column 46, line 23, delete " 2,5-diamionhydroquinone " and insert -- 2,5-diaminohydroquinone --.

Column 47, line 20, delete " group: " and insert -- group: --.
Column 47, line 58, delete "group: " and insert -- group; --.
Column 48, line 12, delete " group: " and insert -- group; --.
Column 48, line 34, delete " group: " and insert -- group; --.
Column 48, line 56, delete " group: " and insert -- group; --.
Column 49, line 11, delete " group: " and insert -- group: --.

Signed and Sealed this

Twenty-eighth Day of September, 1993

Attest:

BRUCE LEHMAN

Attesting Officer

Commissioner of Patents and Trademarks